United States Patent
Hiroi et al.

(10) Patent No.: US 11,713,033 B2
(45) Date of Patent: Aug. 1, 2023

(54) METHOD FOR CONTROLLING ELECTRICALLY DRIVEN FOUR-WHEEL-DRIVE VEHICLE, AND DEVICE FOR CONTROLLING ELECTRICALLY DRIVEN FOUR-WHEEL-DRIVE VEHICLE

(71) Applicant: Nissan Motor Co., Ltd., Yokohama (JP)

(72) Inventors: Daisuke Hiroi, Kanagawa (JP); Kouki Saitou, Kanagawa (JP); Kentaro Hashimoto, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 53 days.

(21) Appl. No.: 17/632,245

(22) PCT Filed: Oct. 22, 2020

(86) PCT No.: PCT/JP2020/039794
§ 371 (c)(1),
(2) Date: Feb. 2, 2022

(87) PCT Pub. No.: WO2022/085168
PCT Pub. Date: Apr. 28, 2022

(65) Prior Publication Data
US 2022/0348184 A1 Nov. 3, 2022

(51) Int. Cl.
*B60W 10/119* (2012.01)
*B60L 15/20* (2006.01)
*B60K 6/52* (2007.10)

(52) U.S. Cl.
CPC ........ *B60W 10/119* (2013.01); *B60L 15/2045* (2013.01); *B60K 6/52* (2013.01);
(Continued)

(58) Field of Classification Search
CPC ........... B60W 10/119; B60W 2520/04; B60W 2520/105; B60W 2520/26;
(Continued)

(56) References Cited

FOREIGN PATENT DOCUMENTS

| CN | 110837679 A | * | 2/2020 |
|---|---|---|---|
| JP | H01-223064 A | | 9/1989 |

(Continued)

*Primary Examiner* — Justin Holmes
(74) *Attorney, Agent, or Firm* — Global IP Counselors, LLP

(57) ABSTRACT

A control method controls an electric four-wheel-drive vehicle to switch a drive torque distribution between a first distribution prioritizing energy efficiency and a second distribution prioritizing driving performance. The distribution is set to the second distribution where wheel slip is detected during a trip, and returned to the first distribution once the vehicle has stopped. When wheel slip is detected at least during acceleration, the distribution is switched from the first distribution to the second distribution. When wheel slip is detected during deceleration, a slip experience flag is set. The slip experience flag is maintained at least until starting off in a subsequent trip. Where the slip experience flag has been set, the distribution is maintained as the second distribution when the vehicle has stopped, and where the slip experience flag has not been set, the distribution is returned to the first distribution upon the vehicle being stopped.

11 Claims, 10 Drawing Sheets

(52) U.S. Cl.
CPC ....... *B60L 2240/12* (2013.01); *B60L 2240/14* (2013.01); *B60L 2240/461* (2013.01); *B60L 2240/465* (2013.01); *B60W 2520/04* (2013.01); *B60W 2520/105* (2013.01); *B60W 2520/26* (2013.01); *B60W 2520/28* (2013.01); *B60W 2720/403* (2013.01); *B60Y 2200/91* (2013.01); *B60Y 2200/92* (2013.01)

(58) Field of Classification Search
CPC ....... B60W 2520/28; B60W 2720/403; B60W 30/18172; B60W 30/182; B60L 15/2045; B60L 2240/12; B60L 2240/14; B60L 2240/461; B60L 2240/465; B60L 3/10; B60L 2220/42; B60L 2240/423; B60L 15/20; B60L 15/32; B60L 2240/421; B60K 6/52; B60Y 2200/91; B60Y 2200/92; Y02T 10/72
See application file for complete search history.

(56) References Cited

FOREIGN PATENT DOCUMENTS

| | | | | |
|---|---|---|---|---|
| JP | 2007-168690 A | 7/2007 | | |
| JP | 2009-159682 A | 7/2009 | | |
| JP | 4473448 B2 * | 6/2010 | ......... | B60K 23/0808 |
| KR | 101655663 B1 * | 9/2016 | | |
| WO | 2015/098933 A1 | 7/2015 | | |
| WO | WO-2015098933 A1 * | 7/2015 | ........... | B60K 17/356 |

\* cited by examiner

METHOD FOR CONTROLLING ELECTRICALLY DRIVEN FOUR-WHEEL-DRIVE VEHICLE, AND DEVICE FOR CONTROLLING ELECTRICALLY DRIVEN FOUR-WHEEL-DRIVE VEHICLE

CROSS-REFERENCE TO RELATED APPLICATIONS

This application is a U.S. national stage application of International Application No. PCT/JP2020/039794, filed on Oct. 22, 2020.

BACKGROUND

Technical Field

The present invention relates to a method and a device for controlling an electrically driven four-wheel-drive vehicle in which four wheels can be driven using a motor.

Background Information

Electrically driven four-wheel-drive vehicles in which four wheels are driven using a motor are known in the prior art. In prior-art electrically driven four-wheel-drive vehicles, when a requested torque established according to an accelerator position, etc., is, e.g., distributed to front wheels and rear wheels, there are cases where a distribution ratio is adjusted.

For example, JP 2009-159682 A discloses a device for controlling drive force, configured such that a distribution ratio is finely adjusted between a first distribution ratio in which energy efficiency of a motor is emphasized and a second distribution ratio in which travel stability of a vehicle established according to load distribution to vehicle wheels is emphasized. More specifically, an assessment as to whether a travel state of the vehicle is stable is made on the basis of, inter alia, the occurrence of slip of the vehicle wheels, the first distribution ratio being selected in cases where the travel state is stable, and the second distribution ratio being selected in cases where the travel state is unstable. Particularly in cases where a fixed time has elapsed from a point in time at which the second distribution ratio was selected, the distribution ratio approaches the first distribution ratio from the second distribution ratio.

SUMMARY

In cases where it is possible to switch between a distribution ratio in which travel stability is emphasized and a distribution ratio in which energy efficiency is emphasized, it is obvious that the distribution ratio in which energy efficiency is emphasized will be selected as a rule, provided that there are no circumstances whereby travel stability is hindered, such as during travel on a road surface where slip readily occurs. However, in cases where the distribution ratio in which travel stability is emphasized has been selected, one important subject for electrically driven four-wheel-drive vehicles in which both travel stability and energy efficiency are to be achieved is the timing at which to then return to the distribution ratio in which energy efficiency is emphasized, or by what operation to then return to said distribution.

In cases where the condition for returning from the distribution ratio in which driving performance is emphasized to the distribution ratio in which energy efficiency is emphasized is the elapsing of a fixed time, there may be cases where travel stability is compromised depending on the state of the road surface and the electrically driven four-wheel-drive vehicle. For example, in cases where the electrically driven four-wheel-drive vehicle has stopped on a road surface where slip readily occurs, the distribution ratio returns to the distribution ratio in which energy efficiency is emphasized when the fixed time elapses, irrespective of the electrically driven four-wheel-drive vehicle still being located on the road surface where slip readily occurs. Because drive force is high while the electrically driven four-wheel-drive vehicle is starting off, this is one scenario in which operation, etc., will tend to become particularly unstable. Therefore, switching to the distribution ratio in which energy efficiency is emphasized according to the elapsing of a fixed time presents disadvantages in that slip readily occurs in cases where the electrically driven four-wheel-drive vehicle sets off on a road surface where slip readily occurs, and travel stability is compromised.

It is an object of the present invention to provide a method and a device for controlling an electrically driven four-wheel-drive vehicle that switches between a distribution ratio in which driving performance such as travel stability is emphasized and a distribution in which energy efficiency is emphasized more appropriately than in the prior art, such that both driving performance and energy efficiency are achieved.

In a method for controlling an electrically driven four-wheel-drive vehicle according to one aspect of the present invention, a distribution of drive torque to front wheels and rear wheels that are vehicle wheels can be switched between a first distribution in which energy efficiency is prioritized and a second distribution in which driving performance is prioritized, the distribution of drive force being set to the second distribution in cases where wheel slip is detected during a trip in which a stopping state is reached after starting off, and the distribution being returned to the first distribution once the vehicle has stopped. When slip of the vehicle wheels is detected at least during acceleration in the trip, the distribution is switched from the first distribution to the second distribution. When slip of the vehicle wheels is detected during deceleration in the trip, a slip experience flag representing that the electrically driven four-wheel-drive vehicle has experienced slipping is set, the slip experience flag being maintained at least until the electrically driven four-wheel-drive vehicle sets off in a subsequent trip. In cases where the slip experience flag has been set, the distribution is maintained as the second distribution when the electrically driven four-wheel-drive vehicle has stopped. In cases where the slip experience flag has not been set, the distribution is returned to the first distribution once the electrically driven four-wheel-drive vehicle has stopped.

BRIEF DESCRIPTION OF THE DRAWINGS

Referring now to the attached drawings which form a part of this original disclosure.

DETAILED DESCRIPTION OF EMBODIMENTS

Figure 1:
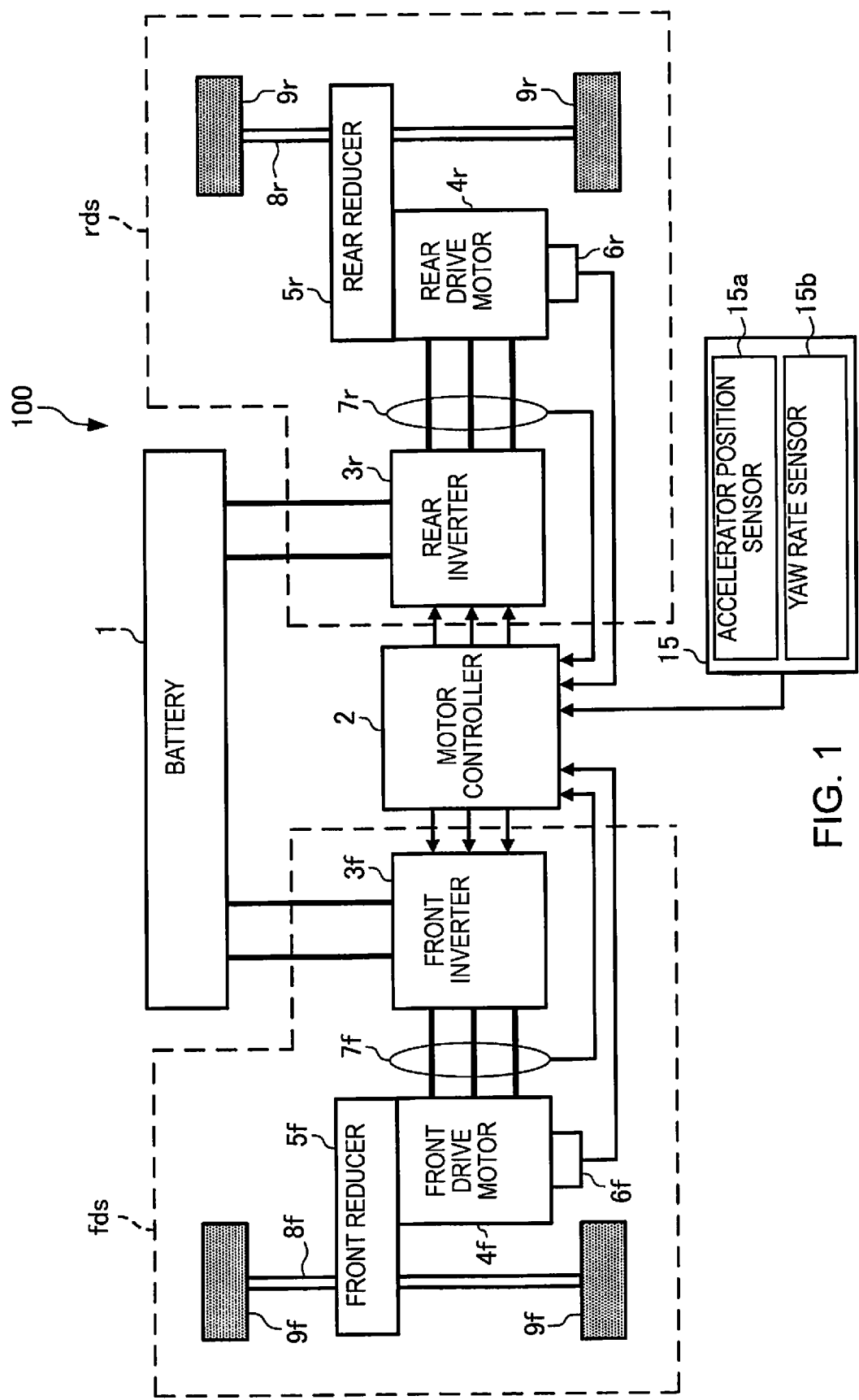
FIG. 1 is a block diagram showing a configuration of an electrically driven four-wheel-drive vehicle in which there is executed a method for controlling an electrically driven four-wheel-drive vehicle according to a first embodiment.

Embodiments of the present invention are described below with reference to the accompanying drawings. FIG. 1 is a block diagram showing a configuration of an electrically driven four-wheel-drive vehicle in which there is executed a method for controlling an electrically driven four-wheel-drive vehicle according to a first embodiment.

An electrically driven vehicle refers to a vehicle provided with an electric motor ("motor") as a drive source, in which drive force originating from torque generated by a motor is generated in one or a plurality of vehicle wheels, whereby the vehicle can travel. Therefore, electrically driven vehicles include hybrid vehicles, in which a motor and an engine are used in combination as drive sources, in addition to "electric vehicles." For example, electrically driven vehicles include hybrid vehicles in which a motor is used as a drive source for either front wheels or rear wheels, and in which an engine is used as a drive source for other vehicle wheels. A four-wheel-drive vehicle refers to a vehicle in which four vehicle wheels can be used as drive wheels. Therefore, four-wheel-drive vehicles include vehicles that are capable of switching between "front-wheel-drive" and "rear-wheel-drive" systems, in addition to vehicles that always use four vehicle wheels in driving. There are also instances where a four-wheel-drive vehicle can be controlled by having some of four vehicle wheels cooperatively serve as drive wheels, or by having each of the four vehicle wheels be independently driven as drive wheels.

Therefore, in the present embodiment, an electrically driven four-wheel-drive vehicle refers to a vehicle in which drive force originating from torque generated by a motor is generated in some or all of four vehicle wheels, whereby the vehicle can travel.

As shown in FIG. 1, a vehicle 100 is an electrically driven four-wheel-drive vehicle. The vehicle 100 comprises a front drive system fds, a rear drive system rds, a battery 1, and a motor controller 2.

The front drive system fds is a system that receives a supply of electric power from the battery 1 and that drives front wheels 9f under control by the motor controller 2. Specifically, the front drive system fds is provided with a front inverter 3f, a front drive motor 4f, a front reducer 5f, a front rotation sensor 6f, a front drive shaft 8f, the front wheels 9f, etc.

The front wheels 9f are a pair of vehicle wheels located relatively toward the forward direction of the vehicle 100, among four vehicle wheels provided to the vehicle 100. The forward direction of the vehicle 100 is a prescribed direction that is formally established in accordance with, inter alia, an orientation of a driver's seat. Due to the front drive system fds, the front wheels 9f function as drive wheels that generate drive force of the vehicle 100.

The rear drive system rds is a system that receives a supply of electric power from the battery 1 and that drives rear wheels 9r under control by the motor controller 2. Specifically, the rear drive system rds is provided with a rear inverter 3r, a rear drive motor 4r, a rear reducer 5r, a rear rotation sensor 6r, a rear drive shaft 8r, the rear wheels 9r, etc., symmetrically with the front drive system fds.

The rear wheels 9r are a pair of vehicle wheels located relatively toward the rearward direction of the vehicle 100, among the four vehicle wheels provided to the vehicle 100. The rearward direction of the vehicle 100 is a direction opposite from the forward direction of the vehicle 100. Due to the rear drive system rds, the rear wheels 9r function as drive wheels that generate drive force of the vehicle 100.

The battery 1 is connected to the motors via the inverters, and supplies drive electric power to the motors through discharging. The battery 1 can be charged by receiving a supply of regenerative electric power from the motors. In the front drive system fds, the battery 1 is connected to the front drive motor 4f via the front inverter 3f. Similarly, in the rear drive system rds, the battery 1 is connected to the rear drive motor 4r via the rear inverter 3r.

The motor controller 2 is a device for controlling the vehicle 100. The motor controller 2 is, for example, a computer configured from a central processing unit (CPU), a read-only memory (ROM), a random access memory (RAM), an input/output interface (I/O interface), etc. The motor controller 2 generates, on the basis of vehicle variables pertaining to the vehicle 100, a control signal for controlling the front drive motor 4f and the rear drive motor 4r. By controlling the front drive motor 4f and the rear drive motor 4r, the motor controller 2 controls the operation of each of the front wheels 9f and the rear wheels 9r.

The vehicle variables are information indicating an operation state or a control state of each component constituting the vehicle 100, or of the vehicle 100 overall. The vehicle variables can be obtained through detection, measurement, computation, etc. For example, an accelerator position, a shift position signal pertaining to a shift lever, a vehicle speed, a yaw rate, a DC current value of the battery 1, a steering angle, and a rotor phase, three-phase AC current, electrical angular velocity, rotational speed, a rotation number, vehicle wheel speed, etc., pertaining to the motors are vehicle variables pertaining to the vehicle 100. The motor controller 2 controls each of the front drive motor 4f and the rear drive motor 4r using these vehicle variables inputted as, e.g., digital signals.

The control signals for controlling the front drive motor 4*f* and the rear drive motor 4*r* are, e.g., pulse width modulation signals (PWM signals) for controlling the current in these motors. The motor controller 2 generates drive signals for the front inverter 3*f* and the rear inverter 3*r* in accordance with the generated PWM signals.

The front inverter 3*f* and the rear inverter 3*r* are provided with, e.g., two switching elements (e.g., power semiconductor elements such as insulated gate bipolar transistors (IG-BTs) or metal-oxide-semiconductor field-effect transistors (MOS-FETs)) corresponding to each phase. In these inverters, the switching elements are turned on or off in accordance with the drive signals generated by the motor controller 2, whereby a DC current supplied from the battery 1 is converted to an AC current, and the current supplied to each of the front drive motor 4*f* and the rear drive motor 4*r* is adjusted. The inverters also inversely convert an AC current generated by the front drive motor 4*f* and the rear drive motor 4*r* due to regenerative braking force to a DC current and adjust the current supplied to the battery 1.

The front drive motor 4*f* and the rear drive motor 4*r* are, e.g., three-phase AC motors, and generate torque (drive force) according to an AC current supplied from the connected inverter. The torque generated by the front drive motor 4*f* is transmitted to the front wheels 9*f* via the front reducer 5*f* and the front drive shaft 8*f*. Similarly, the torque generated by the rear drive motor 4*r* is transmitted to the rear wheels 9*r* via the rear reducer 5*r* and the rear drive shaft 8*r*. The front drive motor 4*f* and the rear drive motor 4*r*, in cases of co-rotation with the front wheels 9*f* and the rear wheels 9*r*, respectively, generate regenerative braking force and recover movement energy of the vehicle 100 as electric energy. The front drive motor 4*f* is a drive source (front drive source) that drives the front wheels 9*f*. Similarly, the rear drive motor 4*r* is a drive source (rear drive source) that drives the rear wheels 9*r* independently from the front wheels 9*f*.

The front reducer 5*f* and the rear reducer 5*r* are configured from, e.g., a plurality of gears. These reducers reduce the rotational speed of the motors to which the reducers are connected and transmit the reduced rotational speed to the drive shafts, whereby drive torque or braking torque ("torque") that is proportional to the reduction ratio is generated A front current sensor 7*f* and a rear current sensor 7*r* detect a current flowing in the motors to which the current sensors are connected and output the detected current to the motor controller 2. In the present embodiment, these current sensors detect respective three-phase AC currents of the motors. Alternatively, a current in two discretionary phases may be detected using the front current sensor 7*f* and the rear current sensor 7*r*, and the current in the remaining phase may be derived by computation.

The vehicle 100 comprises various other sensors 15, in addition to the front rotation sensor 6*f* and front current sensor 7*f* assembled in the front drive system fds and the rear rotation sensor 6*r* and rear current sensor 7*r* assembled in the rear drive system rds. The various other sensors 15 include, e.g., an accelerator position sensor 15*a*, an acceleration sensor (not shown), a vehicle speed sensor (not shown), a yaw rate sensor 15*b*, a global positioning system (GPS) sensor (not shown), and/or a steering angle sensor (not shown). The accelerator position sensor 15*a* detects an accelerator position APO that is the operation amount of an accelerator (not shown). The vehicle speed sensor detects a vehicle speed V of the vehicle 100. The vehicle speed V is the movement speed (vehicle body speed) of the entire vehicle body of the vehicle 100. The yaw rate sensor 15*b* detects a yaw rate of the vehicle 100. The GPS sensor detects position information pertaining to the vehicle 100. The detection values detected by these various sensors 15 are inputted to the motor controller 2. Specifically, the motor controller 2 can, as necessary, acquire the accelerator position APO, the front/rear-direction acceleration, the lateral-direction acceleration, the yaw rate, the position information, the steering angle, and other detected vehicle variables.

Figure 2:
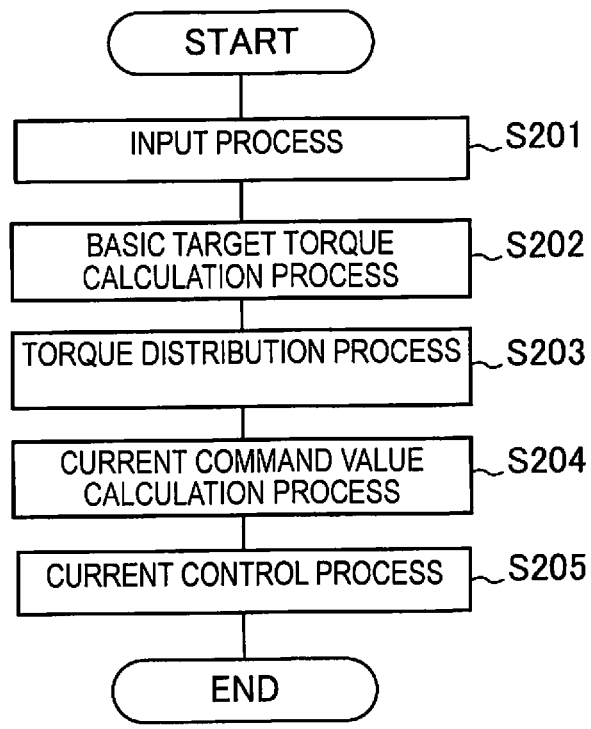
FIG. 2 is a flow chart showing the method for controlling an electrically driven four-wheel-drive vehicle according to the first embodiment.

FIG. 2 is a flow chart showing the method for controlling an electrically driven four-wheel-drive vehicle according to the first embodiment. As shown in FIG. 2, the motor controller 2 executes an input process S201, a basic torque target value calculation process S202, a torque distribution process S203, a current target value calculation process S204, and a current control process S205. The motor controller 2 is programmed so as to execute these processes for each prescribed computation period.

1. Input Process

In the input process S201, the motor controller 2 receives inputs from the various sensors 15, etc., whereby the vehicle variables are acquired. Among parameters used in the subsequent processes, those that are not directly obtained as vehicle variables are acquired by the motor controller 2 in the input process S201 through, inter alia, computation in which the vehicle variables are used.

In the present embodiment, the motor controller 2 acquires the accelerator position APO (%), a rotor phase (rad) and three-phase AC current (A) of the motors, the vehicle speed V (km/h), the yaw rate YR (deg/sec), and a DC voltage value Vdc (V) of the battery 1 from the various sensors 15, etc.

Moreover, in the input process S201, the motor controller 2 acquires (1) a motor electrical angular velocity ωe (rad/s), (2) a motor rotational speed ωm (rad/s), (3) a number of motor rotations Nm (rpm), and (4) a vehicle wheel speed ωw (km/h) through computation as described below.

(1) Motor Electrical Angular Velocity ωe

The motor controller 2 temporally differentiates a rotor phase α to thereby derive motor electrical angular velocities ωe. Specifically, the motor controller 2 differentiates a rotor phase α*f* of the front drive motor 4*f* to thereby derive a front motor electrical angular velocity ωef, and differentiates a rotor phase α*r* of the rear drive motor 4*r* to thereby derive a rear motor electrical angular velocity ωer.

(2) Motor Rotational Speed ωm

The motor controller 2 divides the motor electrical angular velocity ωe by a pole pair number of each motor to calculate a motor rotational speed ωm, which is a mechanical angular velocity. Specifically, the motor controller 2 divides the front motor electrical angular velocity ωef by the pole pair number of the front drive motor 4*f* to thereby calculate a front motor rotational speed ωmf, and divides the rear motor electrical angular velocity ωer by the pole pair number of the rear drive motor 4*r* to thereby calculate a rear motor rotational speed ωmr.

(3) Number of Motor Rotations Nm

The motor controller 2 multiplies each motor rotational speed ωm by a unit conversion coefficient (60/2π) to calculate the number of motor rotations Nm. Specifically, the motor controller 2 converts the units of the front motor rotational speed ωmf to thereby calculate a number of front motor rotations Nmf, and similarly converts the units of the rear motor rotational speed ωmr to thereby calculate a rear rotational speed Nmr.

(4) Vehicle Wheel Speed ωw

The motor controller 2 calculates a vehicle wheel speed ωwf of the front wheels 9f on the basis of a gear ratio of the front reducer 5f and a value obtained by multiplying a rotation radius Rf of the front wheels 9f by the front motor rotational speed ωmf, and similarly calculates a vehicle wheel speed ωwr of the rear wheels 9r on the basis of a gear ratio of the rear reducer 5r and a value obtained by multiplying a rotation radius Rr of the rear wheels 9r by the rear motor rotational speed ωmr. In the present embodiment, a unit conversion coefficient is applied to the vehicle wheel speed ωwf of the front wheels 9f and the vehicle wheel speed ωwr of the rear wheels 9r that have been derived as described above to convert the units of the vehicle wheel speed ωwf of the front wheels 9f and the vehicle wheel speed ωwr of the rear wheels 9r from [m/s] to [km/h].

2. Basic Torque Target Value Calculation Process

In the basic torque target value calculation process S202, the motor controller 2 calculates a basic torque target value Tm0* on the basis of the vehicle variables. The basic torque target value Tm0* is torque requested by the vehicle 100 ("requested torque") according to, inter alia, operation of the accelerator by a driver. The basic torque target value Tm0* is a target value for the total of torque generated by the front drive motor 4f and torque generated by the rear drive motor 4r.

Figure 3:
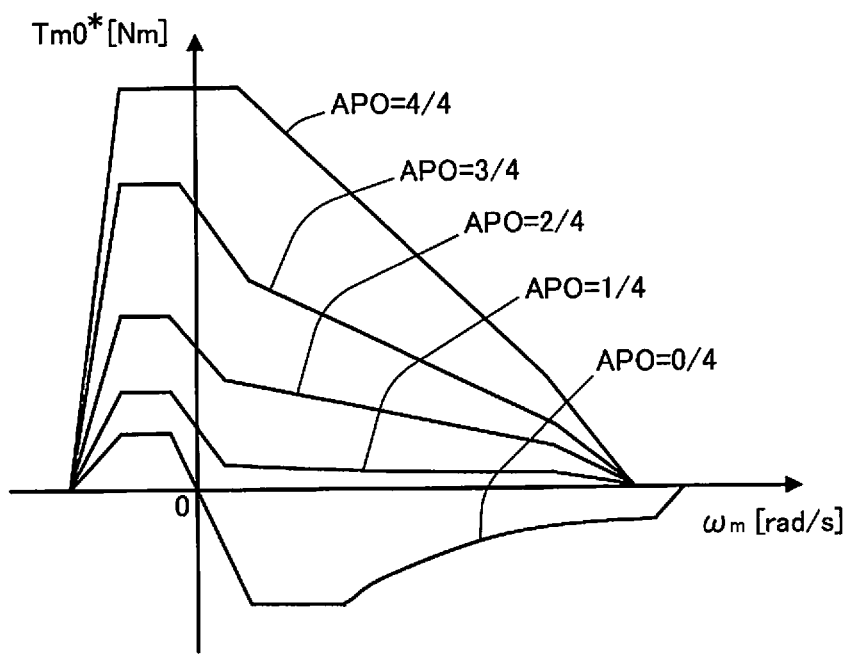
FIG. 3 is a graph showing one example of an accelerator position-to-torque table.

More specifically, the motor controller 2 refers to the accelerator position-to-torque table shown in FIG. 3 and calculates the basic torque target value Tm0* on the basis of the accelerator position APO and the motor rotational speed ωm. When referring to the accelerator position-to-torque table, the motor controller 2 can use the front motor rotational speed ωmf, the rear motor rotational speed ωmr, an average of these two speeds, etc., as the motor rotational speed ωm. In the present embodiment, the motor controller 2 calculates the basic torque target value Tm0* using the front motor rotational speed ωmf.

3. Torque Distribution Process

In the torque distribution process S203, the motor controller 2 distributes the basic torque target value Tm0* to a target value for torque generated by the front drive motor 4f and a target value for torque generated by the rear drive motor 4r. Specifically, in the torque distribution process S203, the basic torque target value Tm0* is distributed to the front wheels 9f and the rear wheels 9r.

Figure 4:
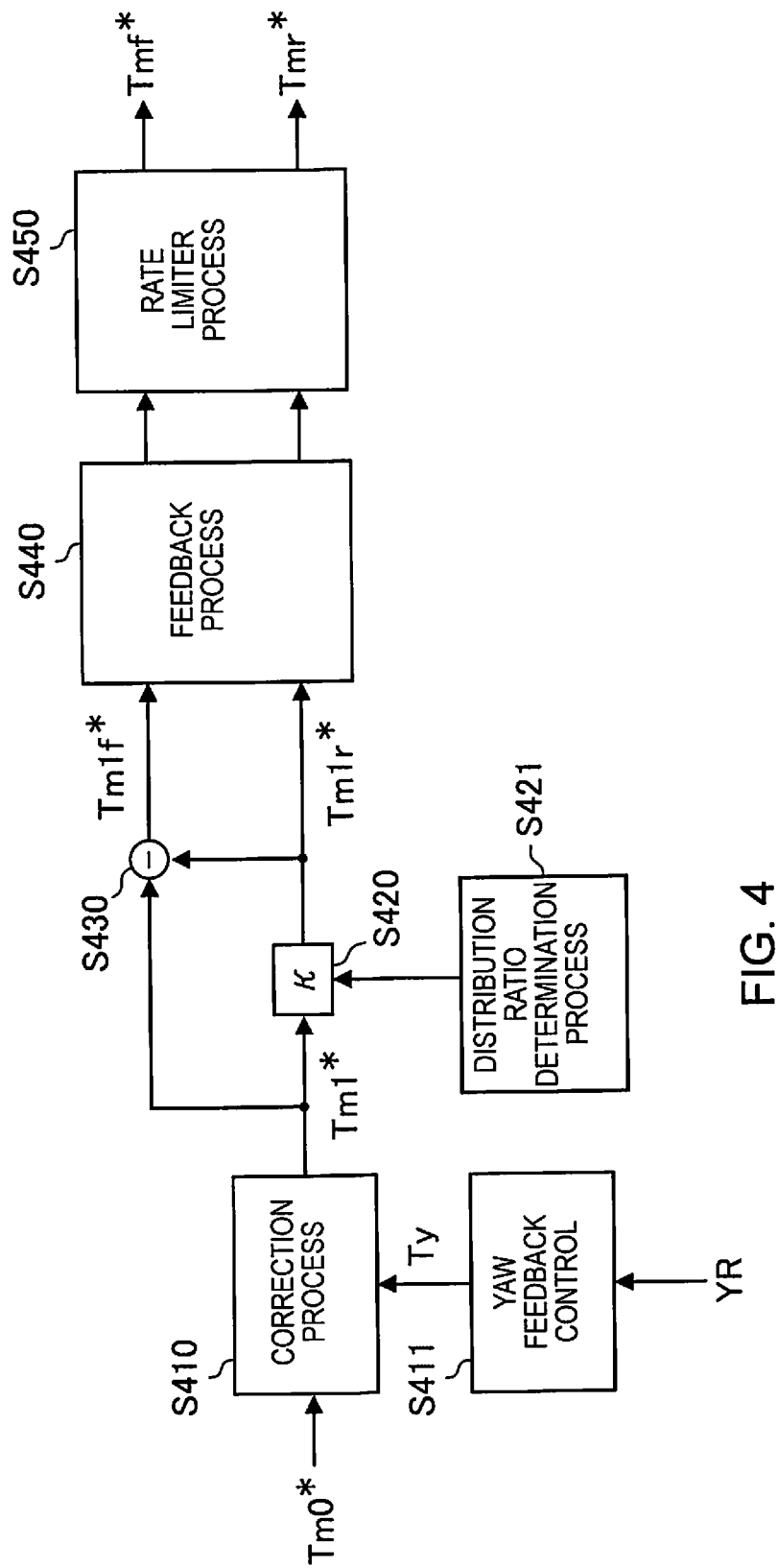
FIG. 4 is a block line diagram showing a configuration of a torque distribution process.

FIG. 4 is a block line diagram showing a configuration of the torque distribution process S203. As shown in FIG. 4, the torque distribution process S203 includes (1) a correction process S410, (2) a rear torque target value calculation process S420, (3) a front torque target value calculation process S430, (4) a feedback process S440, and (5) a rate limiter process S450.

(1) Correction Process

In the correction process S410, the basic torque target value Tm0* is corrected prior to distribution to the front wheels 9f and the rear wheels 9r, whereby the total drive force generated by the front wheels 9f and the rear wheels 9r is restricted. Specifically, in the correction process S410, the basic torque target value Tm0* is multiplied by a prescribed coefficient β to thereby calculate a first torque target value Tm1*.

The prescribed coefficient β multiplied by the basic torque target value Tm0* represents a restriction amount of the basic torque target value Tm0*. Therefore, the prescribed coefficient β is, e.g., a positive number equal to or less than 1. The prescribed coefficient ρ is established on the basis of yaw feedback torque Ty. The yaw feedback torque Ty is fed back in the correction process S410 as described above, whereby lateral-direction slip of the vehicle 100 is reduced. The yaw feedback torque Ty is calculated in a yaw feedback control S411. For example, the yaw feedback torque Ty is calculated on the basis of the steering angle, the yaw rate YR, a difference between the yaw rate YR and a target value therefor ("yaw rate target value"), etc. The yaw rate target value is established on the basis of, e.g., the vehicle speed V and the steering angle.

In the correction process S410, because the basic torque target value Tm0* is restricted by the prescribed coefficient β established on the basis of the yaw feedback torque Ty, the drive force generated by the front wheels 9f and the rear wheels 9r is restricted in accordance with the yaw rate YR. As a result, because the yaw rate YR is reduced, lateral-direction slip of the vehicle 100 or the possibility of such slip is also reduced.

(2) Rear Torque Target Value Calculation Process

In the rear torque target value calculation process 420, the first torque target value Tm1* is multiplied by a prescribed distribution ratio κ, whereby a first rear torque target value Tm1r* is calculated. The distribution ratio κ is determined in a distribution ratio determination process S421 on the basis of, e.g., a setting of a drive mode or a transition in a center-of-gravity position of the vehicle 100. In the present embodiment, a first distribution in which energy efficiency is prioritized and a second distribution in which driving performance is prioritized are established in advance in a switchable manner as distributions of drive force to the front wheels 9f and the rear wheels 9r. In the distribution ratio determination process S421, a selection is made as to which drive force distribution, among the first and second distributions, is to be used to drive the vehicle 100. The distribution ratio κ is determined in accordance with the selected first or second distribution. Specific processes performed in the distribution ratio determination process S421 are described in greater detail later.

The first rear torque target value Tm1r* is, inter alia, corrected by the feedback process S440 and the rate limiter process S450, subsequently becoming a rear torque target value Tmr*. The rear torque target value Tmr* is a target value for torque distributed to the rear wheels 9r within the first torque target value Tm1*. Specifically, the rear torque target value Tmr* is a final target value for torque outputted to the rear wheels 9r from the rear drive motor 4r. Therefore, the motor controller 2 controls the rear drive motor 4r on the basis of the rear torque target value Tmr*. The actual torque generated in the rear wheels 9r due to the control based on the final rear torque target value Tmr* is rear torque Tmr (not shown).

(3) Front Torque Target Value Calculation Process

In the front torque target value calculation process S430, the first rear torque target value Tm1r* is subtracted from the first torque target value Tm1*, whereby a first front torque target value Tm1f* is calculated. The first front torque target value Tm1f* is, inter alia, corrected by the feedback process S440 and the rate limiter process S450, subsequently becoming a front torque target value Tmf*. The front torque target value Tmf* is a target value for torque distributed to the rear wheels 9f within the first torque target value Tm1*. Specifically, the front torque target value Tmf* is a final target value for torque outputted to the front wheels 9f from the front drive motor 4f. Therefore, the motor controller 2 controls the front drive motor 4f on the basis of the front torque target value Tmf*. The actual torque generated in the front wheels 9f due to the control based on the final front torque target value Tmf* is front torque Tmf (not shown). The overall amount of the rear torque Tmr and the front torque Tmf is overall torque Tm (not shown).

In the present embodiment, the first front torque target value Tm1$f$* is calculated in the front torque target value calculation process S430 by subtracting the first rear torque target value Tm1$r$* from the first torque target value Tm1*, but the first front torque target value Tm1$f$* may instead by calculated through other computations, etc. For example, the first front torque target value Tm1$f$* may be calculated using a method in which the first torque target value Tm1* is multiplied by a distribution ratio "1−κ."

(4) Feedback Process

In the feedback process S440, feedback torque FBTf of the front wheels 9$f$ and feedback torque FBTr of the rear wheels 9$r$ are calculated. The feedback torque FBTf of the front wheels 9$f$ is added to the first front torque target value Tm1$f$*, and the feedback torque FBTr of the rear wheels 9$r$ is added to the first rear torque target value Tm1$r$*.

The feedback torque FBTf is calculated on the basis of, e.g., a deviation &ow between the vehicle wheel speed ωwf of the front wheels 9$f$ and the vehicle wheel speed ωwr of the rear wheels 9$r$, a deviation Δωm (not shown) between the front motor rotational speed ωmf and the rear motor rotational speed ωmr, and/or a deviation Δωmf between an actual value and a target value (estimated value) of the front motor rotational speed ωmf. Similarly, the feedback torque FBTr is calculated on the basis of, e.g., the deviation Δωw between the vehicle wheel speed ωwf of the front wheels 9$f$ and the vehicle wheel speed ωwr of the rear wheels 9$r$, the deviation Δωm between the front motor rotational speed ωmf and the rear motor rotational speed ωmr, and/or a deviation Δωmr (not shown) between an actual value and a target value (estimated value) of the rear motor rotational speed ωmr.

In the present embodiment, the feedback torques FBTf and FBTr are calculated on the basis of the deviation Δωw between the vehicle wheel speed ωwf of the front wheels 9$f$ and the vehicle wheel speed ωwr of the rear wheels 9$r$. The deviation Δωw represents the difference between the rotation numbers (or rotational speeds) of the front wheels 9$f$ and the rear wheels 9$r$, and is related to slip of the front wheels 9$f$ and the rear wheels 9$r$. Therefore, the feedback torques FBTf and FBTr calculated on the basis of the deviation Δωw are slip torques Ts related to the occurrence or extent of slip of the vehicle wheels. Adding these feedback torques FBTf and FBTr suppresses or reduces slip of the front wheels 9$f$ and the rear wheels 9$r$, respectively.

(5) Rate Limiter Process

In the rate limiter process S450, upper-limit values are set for the respective rates of change of the first front torque target value Tm1$f$* to which the feedback torque FBTf has been added and a second rear torque target value Tm2$r$* to which the feedback torque FBTr has been added.

4. Current Target Value Calculation Process

In the current target value calculation process S204 shown in FIG. 2, dq-axis current target values for the front drive motor 4$f$ and the rear drive motor 4$r$ are calculated. The dq-axis current target value for the front drive motor 4$f$ is calculated by referring to a prescribed table established in advance, on the basis of the front torque target value Tmf* and the DC voltage value Vdc of the battery 1. Similarly, the dq-axis current target value for the rear drive motor 4$r$ is calculated by referring to a prescribed table established in advance, on the basis of the rear torque target value Tmr* and the DC voltage value Vdc of the battery 1.

5. Current Control Process

In the current control process S205, the front drive motor 4$f$ and the rear drive motor 4$r$ are driven on the basis of the dq-axis current target values therefor, whereby torque designated by each of the front torque target value Tmf* and the rear torque target value Tmr* is outputted.

Specifically, the dq-axis current value is first calculated on the basis of the three-phase AC current value and the rotor phase. Next, dq-axis voltage command values are calculated from a deviation between the dq-axis current value and a dq-axis current target value calculated in the current target value calculation process S204. Furthermore, a three-phase AC voltage command value is calculated on the basis of the dq-axis voltage command value and the rotor phase. A PWM signal is derived on the basis of the three-phase voltage command value and the DC voltage value Vdc of the battery 1. The dq-axis current value, the dq-axis voltage command value, the three-phase AC voltage command value, and the PWM signal are calculated for each of the front drive motor 4$f$ and the rear drive motor 4$r$. The switching elements of the front inverter 3$f$ and the rear inverter 3$r$ are opened and closed according to the PWM signals derived in this manner, whereby the front drive motor 4$f$ and the rear drive motor 4$r$ are driven by torque designated by the front torque target value Tmf* and the rear torque target value Tmr*, respectively.

The distribution ratio determination process S421 (refer to FIG. 4) is next described in greater detail.

Figure 5:
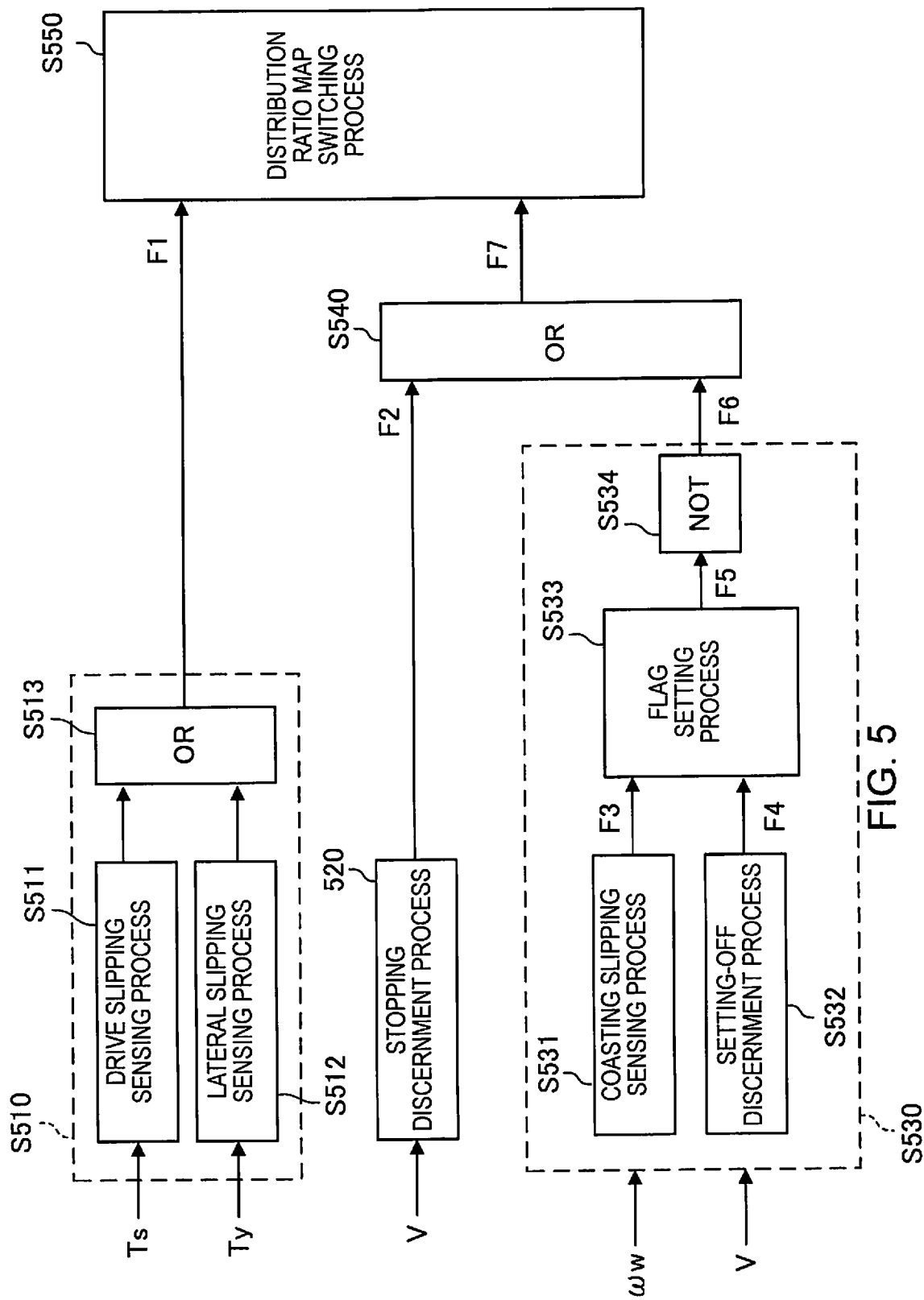
FIG. 5 is a block line diagram showing a configuration of a distribution ratio determination process.

FIG. 5 is a block line diagram showing a configuration of the distribution ratio determination process S421. The distribution ratio determination process S421 includes (a) a slip discernment process S510, (b) a stop discernment process S520, (c) a slip experience flag process S530, (d) a logical sum process S540, and (e) a distribution map switching process S550.

(a) Slip Discernment Process

In the slip discernment process S510, it is discerned whether or not slip is occurring. Slip of the vehicle wheels as discerned in the slip discernment process S510 includes three forms, e.g., first slip, second slip, and third slip.

The first slip is a form of slip in which one or both of the vehicle wheel speed ωwf of the front wheels 9$f$ and the vehicle wheel speed ωwr of the rear wheels 9$r$ exceeds the vehicle speed V, whereby the front wheels 9$f$ and/or the rear wheels 9$r$ idly spin. Specifically, the first slip occurs when the drive force is excessively high relative to road surface resistance. Therefore, the first slip generally occurs during acceleration of the vehicle 100. The first slip is referred to below as "drive slip."

The second slip is a form of slip in which one or both of the vehicle wheel speed ωwf of the front wheels 9$f$ and the vehicle wheel speed ωwr of the rear wheels 9$r$ falls below the vehicle speed V, whereby the front wheels 9$f$ and/or the rear wheels 9$r$ are dragged by the vehicle 100. Specifically, the second slip occurs when the vehicle wheel speed ωw is excessively low relative to the vehicle speed V. The second slip includes forms of slip in which the vehicle wheel speed ωw reaches zero and the vehicle wheels are dragged by the vehicle 100 in a "locked" state. The second slip generally occurs during deceleration of the vehicle 100. The second slip is referred to below as "coasting slip."

The third slip is a form of slip in which the vehicle 100 slides in a lateral direction perpendicular to a drive direction (advancement direction). The third slip occurs, e.g., in cases where the vehicle speed V is excessively high on a curved travel route, or in cases where a steering wheel is suddenly operated. The third slip includes forms of slip in which either of the front wheels 9f and the rear wheels 9r are sliding laterally. The third slip can occur simultaneously with the first slip or the second slip. The third slip is referred to below as "lateral slip."

Drive slip (first slip) and coasting slip (second slip) are discriminated from lateral slip (third slip) by being forms of front/rear-direction slip, i.e., longitudinal-direction slip of the vehicle 100. Drive slip and coasting slip are referred to below as longitudinal slip in contrast to the lateral slip.

Thus, there are a plurality of forms of slip that can be experienced by the vehicle 100. In the present embodiment, the slip discernment process S510 includes (a1) a drive slip sensing process, (a2) a lateral slipping sensing process S12, and a comprehensive discernment process S513, as shown in FIG. 5.

(a1) Drive Slip Sensing Process

In the drive slip sensing process S511, the occurrence of drive slip (first slip) is detected on the basis of the magnitude of the feedback torque in a control for reducing drive slip and other forms of slip of the vehicle wheels through a feedback process (feedback process S440). In the present embodiment, the slip torque Ts calculated in the feedback process S440 is used in sensing the drive slip. As described above, the slip torque Ts is calculated on the basis of the deviation $\Delta\omega w$ between the vehicle wheel speed $\omega wf$ of the front wheels 9f and the vehicle wheel speed $\omega wr$ of the rear wheels 9r ("slip rate"). In the simplest case, the slip torque Ts is a parameter in which the deviation $\Delta\omega w$ is converted to torque. As shall be apparent from this calculation method, the absolute value of the slip torque Ts increases in cases where the front wheels 9f or the rear wheels 9r have experienced drive slip. Therefore, in the drive slip sensing process S511, the absolute value of the slip torque Ts is compared with a prescribed threshold value ("first threshold value Th1"). This first threshold value is a reference value representing the fact that drive slip is regarded to have occurred when the absolute value of the slip torque Ts has reached a certain level. Therefore, when the absolute value of the slip torque Ts has reached or exceeded the first threshold value Th1, it is detected that drive slip has occurred in the vehicle 100. The first threshold value Th1 is established in accordance with the vehicle 100 through experimentation, simulation, etc. The result of sensing in the drive slip sensing process S511 is, e.g., a Boolean value that is "0 (False)" in cases where drive slip is not occurring, and that is "1 (True)" in cases where longitudinal slip is occurring.

(a2) Lateral Slip Sensing Process

In the lateral slip sensing process S512, the occurrence of lateral slip (third slip) is detected on the basis of the magnitude of the feedback torque (yaw feedback torque Ty) in a control for reducing lateral slip of the vehicle wheels through a feedback process (correction process S410). In the present embodiment, the absolute value of the yaw feedback torque Ty is compared with a prescribed threshold value ("second threshold value Th2"). The absolute value of the yaw feedback torque Ty increases in cases where the front wheels 9f and/or the rear wheels 9r have experienced lateral slip. The second threshold value Th2 is a reference value representing the fact that lateral slip is regarded to have occurred when the absolute value of the yaw feedback torque Ty has reached a certain level. Therefore, in the lateral slip sensing process S512, when the absolute value of the yaw feedback torque Ty has reached or exceeded the second threshold value Th2, it is detected that lateral slip has occurred in the vehicle 100. The second threshold value Th2 is established in advance in accordance with the vehicle 100 through experimentation, simulation, etc. The result of sensing in the lateral slip sensing process S512 is, e.g., a Boolean value that is "0 (False)" in cases where lateral slip is not occurring, and that is "1 (True)" in cases where lateral slip is occurring.

In the comprehensive discernment process S513, the occurrence of slip is comprehensively discerned on the basis of the result of sensing in the drive slip sensing process S511 and the result of sensing in the lateral slip sensing process S512. In the present embodiment, a logical sum ("OR") of the result of sensing in the drive slip sensing process S511 and the result of sensing in the lateral slip sensing process S512 is computed. Therefore, in the comprehensive discernment process S513, it is discerned that slip is occurring in the vehicle 100 ("1 (True)") in cases where longitudinal slip or lateral slip is occurring, and it is discerned that slip is not occurring in the vehicle 100 ("0 (False)") in cases where neither drive slip nor lateral slip is occurring. The result of discernment in the comprehensive discernment process S513 is outputted as a result of discernment ("slip flag") F1 in the slip discernment process S510. The slip flag F1 is used in the slip experience flag process S530 and the distribution ratio map switching process S550.

(b) Stopping Discernment Process

In the stopping discernment process S520, it is discerned whether the vehicle 100 has stopped. In the present embodiment, the vehicle speed V is compared with a prescribed threshold value ("third threshold value Th3"). In addition, a continuation time during which the vehicle speed V is at or below the third threshold value Th3 is compared with a prescribed threshold value ("fourth threshold value Th4"). In cases where the vehicle speed V is at or below the third threshold value Th3 and it is detected that the time for which the vehicle speed V has been at or below the third threshold value Th3 has continued to or above the fourth threshold value Th4, it is discerned that the vehicle 100 has stopped. The result of discernment ("stop flag") F2 in the stopping discernment process S520 is "1 (True)" when the vehicle 100 has stopped, and is "0 (False)" while the vehicle 100 is traveling or stopping. The stop flag F2 is used in the logical sum process S540.

The third threshold value Th3 is a reference value representing the vehicle speed V at which it can be considered that the vehicle 100 has substantially stopped. Therefore, the third threshold value Th3 is established in advance in a discretionary manner on the basis of experimentation, simulation, etc. The third threshold value Th3 is, e.g., about 7 km/h. The continuation time is discerned, using the fourth threshold value Th4, in order to guarantee stability in the discernment of stopping according to speed in which the third threshold value Th3 is used. For example, the continuation time is discerned according to the fourth threshold value Th4 so that a situation in which a vehicle speed V at or below the third threshold value Th3 is temporarily attained under circumstances such as actual travel is not discerned as stopping of the vehicle 100. Therefore, the value of the fourth threshold value Th4 is established in advance in a discretionary manner within a range for this purpose.

(c) Slip Experience Flag Process

In the slip experience flag process S530, a slip experience flag F5 is set or removed. The slip experience flag F5 represents that an experience in which the vehicle 100 has slipped ("slip experience") has occurred. The slip experience flag F5 is "1 (True)" in cases where a slip experience is maintained, and is "0 (False)" in cases where the slip experience has been removed (cleared). The slip experience flag F5 is outputted upon being reversed for the purpose of computation in the logical sum process S540.

The slip experience flag process S530 includes (c1) a coasting slip sensing process S531, (c2) a setting-off discernment process S532, (c3) a flag setting process S533, and (c4) a reversal process S534, as shown in FIG. 5.

(c1) Coasting Slip Sensing Process

In the coasting slip sensing process S531, coasting slip (second slip) is detected. Specifically, during deceleration of the vehicle 100, it is detected whether a difference A between the speed ωw of the vehicle wheels and the speed of the vehicle 100 (vehicle speed V) has reached or exceeded a prescribed value established in advance, whereby coasting slip is detected. A coasting slip sensing flag F3, which is the result of sensing coasting slip, is used in the flag setting process S533. The coasting slip sensing flag F3 is "1 (True)" when coasting slip is detected, and is "0 (False)" in cases where coasting slip is not detected.

(c2) Setting-Off Discernment Process

In the setting-off discernment process S532, it is discerned, on the basis of the vehicle speed V, whether the vehicle 100 has set off. Specifically, the vehicle speed V is compared with a prescribed threshold value ("fifth threshold value Th5"). In addition, a continuation time during which the vehicle speed V is at or below the fifth threshold value Th5 is compared with a prescribed threshold value ("sixth threshold value Th6"). In cases where the vehicle speed V is at or above the fifth threshold value and it is detected that the time for which the vehicle speed V has been at or above the fifth threshold value Th5 has continued to or above the sixth threshold value Th6, it is discerned that the vehicle 100 has set off. A result of discernment ("setting-off flag") F4 in the setting-off discernment process S532 is "1 (True)" when the vehicle 100 has set off, and is "0 (False)" while the vehicle 100 is stopped or traveling. The setting-off flag F4 is used as a removal flag for the slip experience flag F5 in the flag setting process S533.

The fifth threshold value Th5 is a reference value representing the vehicle speed V at which it can be considered that the vehicle 100 has substantially set off. Therefore, the fifth threshold value Th5 is established in advance in a discretionary manner on the basis of experimentation, simulation, etc. The fifth threshold value Th5 that stipulates starting off of the vehicle 100 and the above-mentioned third threshold value Th3 that stipulates stopping of the vehicle 100 may be set to equal values, or can be set to mutually different values. In the present embodiment, the fifth threshold value Th5 is set to a greater value than the third threshold value Th3 in order to reliably discern stopping and starting off of the vehicle 100.

The continuation time is discerned, using the sixth threshold value Th6, in order to guarantee stability in the discernment of starting off in which the fifth threshold value Th5 is used. For example, there may be cases in which the vehicle 100 is moved in order, inter alia, to adjust a stopping position, or other cases in which it cannot be said that the vehicle 100 has substantially started traveling, despite the vehicle 100 having reached a vehicle speed V equal to or greater than the fifth threshold value Th5. Therefore, the continuation time is discerned, according to the sixth threshold value Th6, so that such situations are not discerned as starting off of the vehicle 100. The sixth threshold value Th6 is established in a discretionary manner within a range for this purpose.

(c3) Flag Setting Process

In the flag setting process S533, the slip experience flag F5 is set or cleared (rescinded). "Setting" of the slip experience flag F5 refers to setting the slip experience flag F5 to "1 (True)." "Clearing (rescinding)" of the slip experience flag F5 refers to setting the slip experience flag F5 to "0 (False)."

In the flag setting process S533, the slip experience flag F5 is set in cases where coasting slip is detected, i.e., when the coasting slip sensing flag F3 is "1 (True)," in a single trek during which the vehicle 100 has reached a stopped state from starting off ("trip").

In the flag setting process S533, the slip experience flag is cleared on the basis of the setting-off flag F4. Specifically, if the vehicle 100 has set off and the result of discernment in the setting-off discernment process S532 is "1 (True)," the slip experience flag F5 that had been set (set to "1 (True)") is instead set to "0 (False)."

Therefore, the slip experience flag F5 is set in cases where coasting slip is detected in a given trip, and is cleared in cases where the vehicle 100 has set off in a subsequent trip. After the vehicle 100 has set off, the slip experience flag F5 is maintained in a cleared state until coasting slip is detected.

(c4) Reversal Process

In the reversal process S534, the slip experience flag F5 described above is reversed through a negation operation ("NOT") for the purpose of computation in the logical sum process S540. Therefore, when coasting slip is detected, a flag F6 that is finally outputted in the slip experience flag process S530 is "0 (False)" until the vehicle 100 sets off in a subsequent trip. Moreover, after the vehicle 100 has set off, the flag F6 is "1 (True)" until coasting slip is detected.

(d) Logical Sum Process

In the logical sum process S540, a logical sum ("OR") of the stop flag F2 and the flag F6 obtained by reversing the slip experience flag F5 is computed. A flag F7 that is the result of the logical sum process S540 functions as a maintenance flag or a clearing flag for an electricity consumption cancellation flag F8 (not shown).

The flag F7 is "1 (True)" in cases where both the stop flag F2 and the flag F6 are "1 (True)," and otherwise is "0 (False)." Therefore, in cases where the vehicle 100 has stopped while a slip experience is occurring, the stop flag F2 is "1 (True)" and the flag F6 is "0 (False)." Thus, in cases where a slip experience occurs during a given trip while the vehicle is stopping in said trip, the flag F7 is "0 (False)." However, when the vehicle 100 has stopped while no slip experience is occurring, the stop flag F2 is "1 (True)" and the flag F6 is "1 (True)." Therefore, in cases where no slip experience is occurring during a given trip while the vehicle is stopping in said trip, the flag F7 is "1 (True)."

(e) Distribution Ratio Map Switching Process

In the distribution ratio map switching process S550, switching between distribution ratio maps applied to the vehicle 100 is performed. The distribution ratio map establishes proportions of torque distributed to the front wheels 9f and/or the rear wheels 9r. In the present embodiment, the distribution ratio map establishes, in accordance with the first torque target value Tm1* and the vehicle speed V, a proportion of torque distributed to the rear wheels 9r within the first torque target value Tm1* (said proportion being a "rear distribution ratio"). The distribution ratio map is established in advance on the basis of experimentation, simulation, etc.

Figure 6:
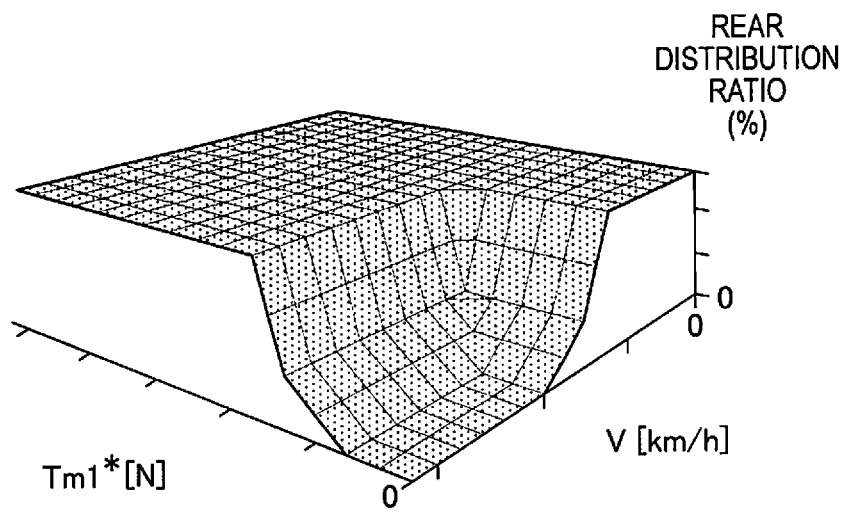
FIG. 6 is a distribution ratio map for establishing a distribution ratio in which energy efficiency of a battery is prioritized.

For example, FIG. 6 is a distribution ratio map for establishing a distribution ratio κ in which energy efficiency ("electricity consumption") of the battery 1 is prioritized (said map being an "electricity consumption map"). The electricity consumption map shown in FIG. 6 generally establishes that the rear distribution ratio is increased as the first torque target value Tm1* or the vehicle speed V increases. Thus, the electricity consumption map establishes a rear distribution ratio realizing excellent electricity consumption in accordance with circumstances such as travel of the vehicle 100.

Figure 7:
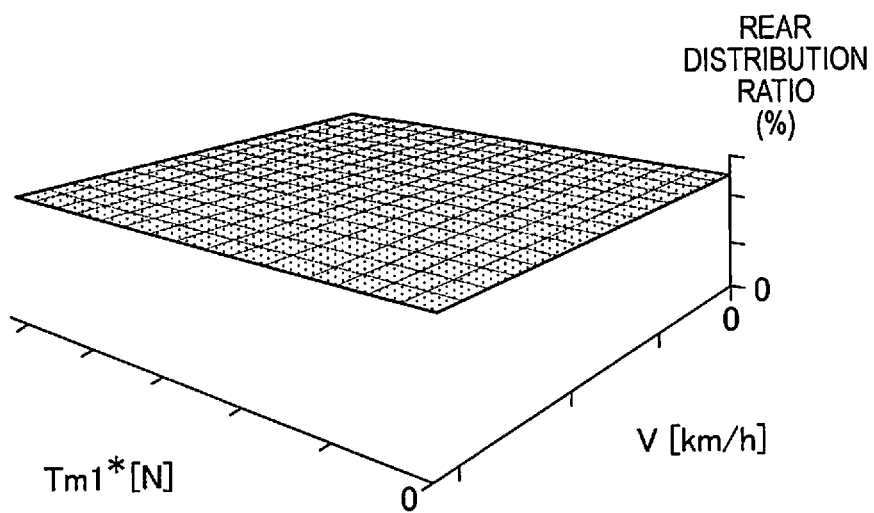
FIG. 7 is a distribution ratio map for establishing a distribution ratio in which driving performance of a vehicle is prioritized.

In addition, FIG. 7 is a distribution ratio map for establishing a distribution ratio κ in which driving performance of the vehicle 100 is prioritized (said map being a "driving performance map"). The driving performance map shown in FIG. 7 establishes that the rear distribution ratio is set to, e.g., a prescribed fixed value independent from the first torque target value Tm1* and the vehicle speed V. Specifically, the driving performance map establishes a rear distribution ratio realizing excellent travel stability, etc., of the vehicle 100 by causing the vehicle 100 to continue four-wheel-drive operation at a substantially fixed rear distribution ratio.

In the present embodiment, through the distribution ratio map switching process S550, the motor controller 2 switches the distribution of drive force (torque) to the front wheels 9f and the rear wheels 9r between a first distribution that is based on the electricity consumption map in which energy efficiency is prioritized and a second distribution that is based on the driving performance map in which driving performance is prioritized.

In the distribution ratio map switching process S550, a flag for establishing whether the distribution ratio κ should be determined using the electricity consumption map or the driving performance map is set on the basis of the slip flag F1 and the flag F7. In the present embodiment, the distribution ratio κ is established in accordance with the electricity consumption map as a rule, provided that there are no special circumstances to consider. In cases in which it is highly likely that the vehicle 100 is on a road surface where slip readily occurs, such as when the vehicle 100 is experiencing slip, the distribution ratio κ is established in accordance with the driving performance map. Therefore, in the present embodiment, in the distribution ratio map switching process S550, the electricity consumption map cancellation flag F8 (not shown) is set or cleared, said flag F8 establishing whether or not to suspend (cancel) or interrupt usage of the electricity consumption map.

Specifically, the electricity consumption map cancellation flag F8 is set to "1 (True)" in cases where the slip flag F1 is "1 (True)." Thus, the distribution ratio map to which reference is made in order to determine the distribution ratio κ is switched from the electricity consumption map to the driving performance map, and the distribution ratio κ is established on the basis of the driving performance map. Specifically, in the distribution ratio map switching process S550, the slip flag F1 functions as a setting flag for the electricity consumption cancelation flag F8.

However, in the distribution ratio map switching process S550, the flag F7 functions as a maintenance flag or a clearing flag for the electricity consumption map cancellation flag F8. Specifically, after the electricity consumption map cancellation flag F8 has been set to "1 (True)," the electricity consumption map cancellation flag F8 is maintained at "1 (True)" while the flag F7 is "0 (False)." Therefore, the distribution ratio κ is determined on the basis of the driving performance map. If the flag F7 becomes "1 (True)," then the electricity consumption map cancellation flag F8 is cleared to "0 (False)." As a result, the distribution ratio map is switched to the electricity consumption map. Therefore, the distribution ratio κ is established on the basis of the electricity consumption map.

As described above, in the distribution ratio determination process S421, in cases where wheel slip is detected during a trip during which the vehicle 100 has reached a stopped state from starting off (slip discernment process S510), the distribution of drive force is changed from a distribution established on the basis of the electricity consumption map (first distribution) to a distribution established on the basis of the driving performance map (second distribution) (distribution ratio map switching process S550). If no second instance of slip is detected during the trip, then the flag F7 is "1 (True)" while the vehicle 100 is stopping, and therefore the distribution of drive force is returned to the distribution established on the basis of the electricity consumption map (first distribution) (distribution ratio map switching process S550).

However, in cases where slip of the vehicle wheels is furthermore detected during a trip in which slip of the vehicle wheels has been detected, the slip experience flag F5 is set to "1 (True)." The slip experience flag F5 is maintained until the vehicle 100 sets off in a subsequent trip. As a result, because the flag F7 is "0 (False)" while the vehicle 100 is stopping in a trip in which slip of the vehicle wheels is initially detected, the distribution of drive force is maintained in the distribution established on the basis of the driving performance map (second distribution) at least until the vehicle 100 sets off in a subsequent trip.

The effect of the method for controlling the vehicle 100 according to the present embodiment is described next.

Figure 8:
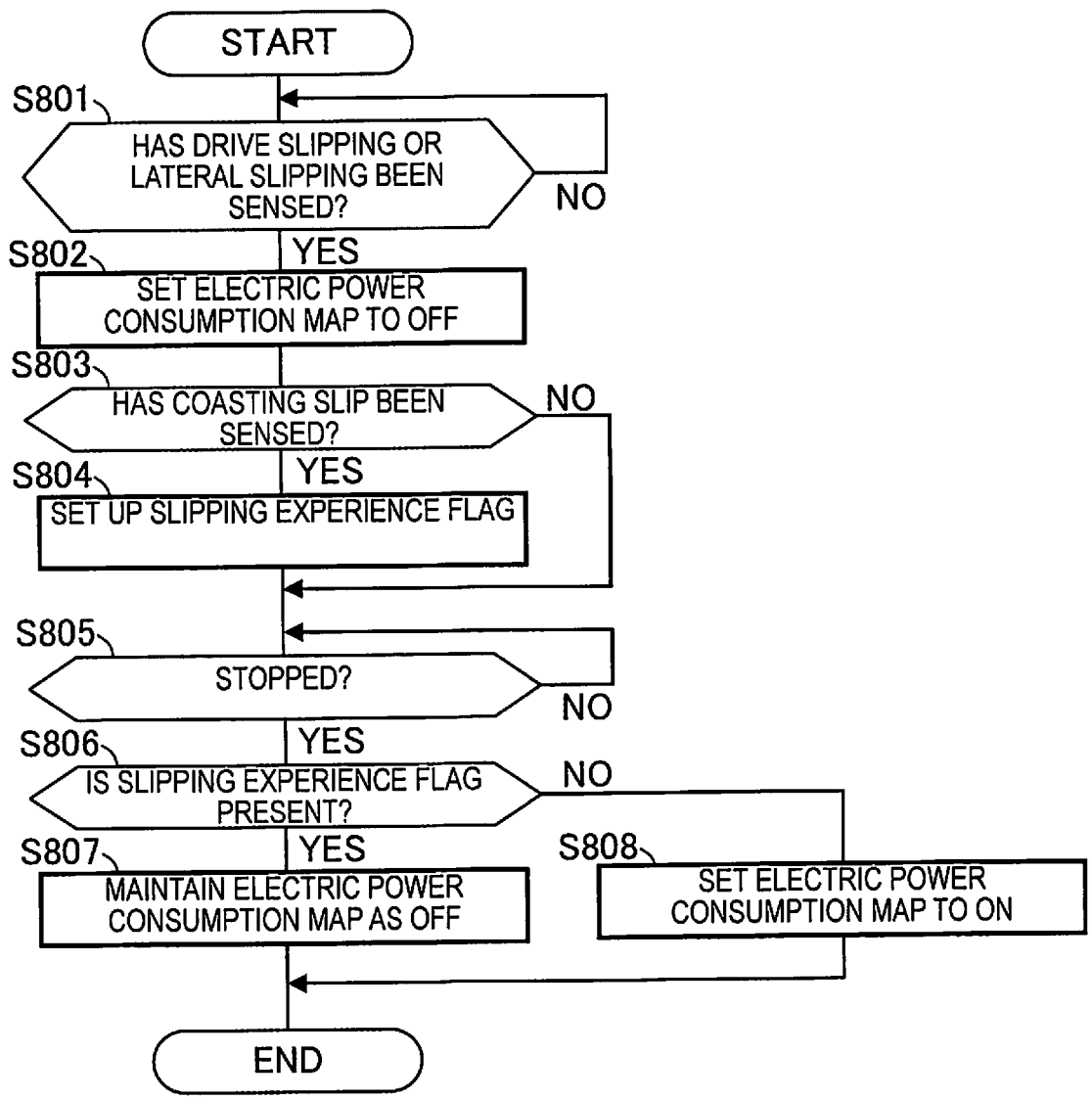
FIG. 8 is a flow chart showing a method for controlling a vehicle according to the present embodiment.

FIG. 8 is a flow chart showing t method for controlling the vehicle 100 according to the present embodiment. As shown in FIG. 8, drive slip and lateral slip are monitored through the slip discernment process S510 when the vehicle 100 starts up (NO in step S801). When drive slip or lateral slip is detected (YES in step S801), the slip flag F1 in the slip discernment process S510 is "1 (True)." As a result, the electricity consumption map is off (step S802). Specifically, due to the distribution ratio map switching process S550, the distribution ratio κ is switched from the first distribution established according to the electricity consumption map to the second distribution established according to the driving performance map. Therefore, when drive slip and lateral slip are detected during a trip, the electricity consumption map is off at that point in time, and the driving performance map is used.

However, if coasting slip is detected (YES in step S803), the slip experience flag F5 is set through the flag setting process S533. When the vehicle 100 has stopped (YES in step S805), the electricity consumption map is maintained in an off state (step S807) in a state in which the slip experience flag F5 has been set (YES in step S806). Specifically, in cases where a trip has ended and the vehicle 100 has stopped under circumstances such that coasting slip is detected, the electricity consumption map is not returned to an on state, and the driving performance map continues to be used at least until the vehicle 100 sets off in a subsequent trip. In cases where coasting slip is detected, it is highly likely that the vehicle 100 is on a road surface where slip readily occurs. Therefore, the distribution ratio map being used is not easily returned to the electricity consumption map, and the driving performance map continues to be used at least until the vehicle 100 sets off in a subsequent trip. This makes it possible to cause the vehicle 100 to set off stably without slipping, even if one trip has ended and the vehicle 100 has stopped on a road surface where slip readily occurs.

In cases where the vehicle 100 has stopped (S805) without coasting slip having been detected (NO in step S803), the slip experience flag is not set (NO in step S806).

Therefore, the electricity consumption map is again set to an on state through the distribution ratio map switching process S550 (step S808). Even if drive slip and lateral slip have been detected during a trip and the distribution ratio map has been switched to the driving performance map, in cases where no coasting slip is subsequently detected during stopping, etc., it is highly likely that the vehicle 100 has already passed the road surface where slip readily occurs. Therefore, the distribution ratio map being used is returned to the electricity consumption map, and a switch is made to the distribution ratio is in which electricity consumption is prioritized. This makes it possible, in cases where the vehicle 100 has stopped on a road surface where it is highly likely that the vehicle 100 can set off without slipping, to distinguish that this is the case and suitably switch to the distribution ratio in which electricity consumption is prioritized.

Figure 9:
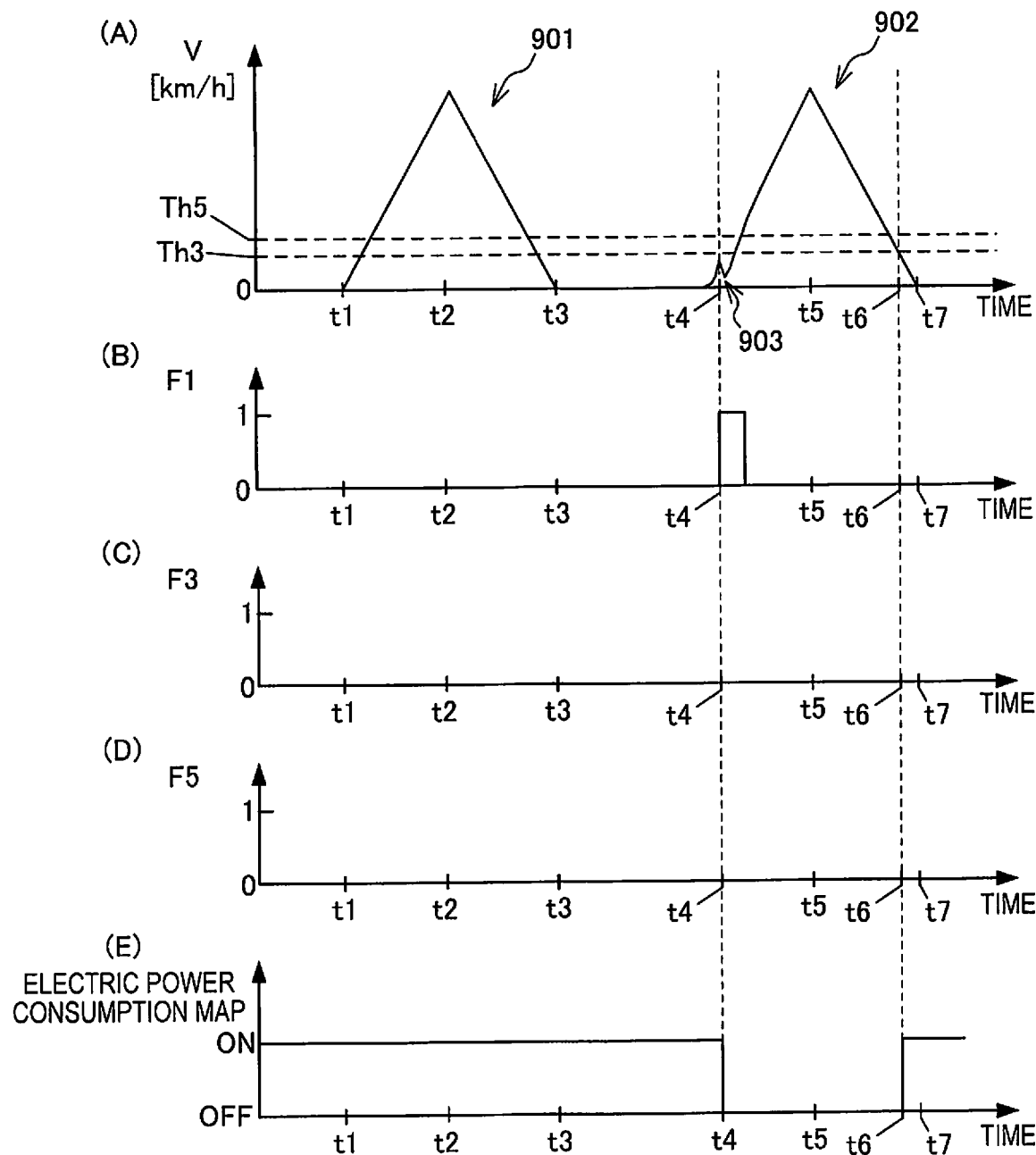
FIG. 9 is a timing chart showing examples of (A) vehicle speed, (B) a slip flag, (C) a coasting slip sensing flag, (D) a slip experience flag, and (E) a transition of an electricity consumption map between on and off states.

FIG. 9 is a timing chart showing examples of (A) the vehicle speed V, (B) the slip flag F1, (C) the coasting slip sensing flag F3, (D) the slip experience flag F5, and (E) a transition of the electricity consumption map between on and off states. As shown in FIG. 9(A), for example, in a first trip 901, the vehicle 100 accelerates from time t1 to time t2, and then decelerates from time t2 to time t3. In the first trip 901, no slip of the vehicle wheels is detected during acceleration or deceleration. In this case, as shown in FIGS. 9(B) and 9(C), the slip flag F1 remains "0 (False)." Because the slip flag F1 remains "0 (False)," the slip experience flag F5 also remains "0 (False)," as shown in FIG. 9(D). Therefore, the electricity consumption map remains on ("ON"), and the distribution ratio κ is calculated in accordance with the electricity consumption map in the first trip 901. Thus, the first trip 901 is conducted with excellent electricity consumption.

However, in a second trip 902, for example, the vehicle 100 accelerates from time t4 to time t5, and decelerates from time t5 to time t7 to reach a stopped state. In the second trip 902, as shown in FIG. 9(A), drive slip (or lateral slip) occurs, and a disturbance 903 is produced in the vehicle speed V. This drive slip occurs during starting off substantially immediately after time t4. Thus, when drive slip occurs during acceleration such as during starting off, the slip flag F1 is "1 (True)," as shown in FIG. 9(B). Therefore, the electricity consumption map cancellation flag F8 is set to "1 (True)" in the distribution ratio map switching process S550. As a result, as shown in FIG. 9(E), the electricity consumption map is switched off ("OFF"), and the driving performance map is used from time t4 when drive slip occurred.

In the second trip 902, the trip subsequently ends without coasting slip having occurred (refer to FIGS. 9(A) and 9(C)). Therefore, as shown in FIG. 9(D), the slip experience flag F5 is maintained at "0 (False)" during the second trip 902. Thus, at time t6, at the point in time when the vehicle speed V falls to or below the third threshold value Th3 and it is discerned that the vehicle 100 has stopped, the stop flag F2 is "1 (True)" and the slip experience flag F5 is "0 (False)." The flag F7, which is the negation of the logical disjunction of these two flags, is "1 (True)." In the distribution ratio map switching process S550, this flag F7 is used so as to clear the electricity consumption map cancellation flag F8. Therefore, at time t6, the electricity consumption map cancellation flag F8 is cleared to "0 (False)," and the electricity consumption map is returned to being on ("ON") (refer to FIG. 9(E)). As a result, for example, in a subsequent trip (not shown) that follows the second trip 902, the vehicle 100 is driven using the distribution ratio κ based on the electricity consumption map from the time of starting off.

Figure 10:
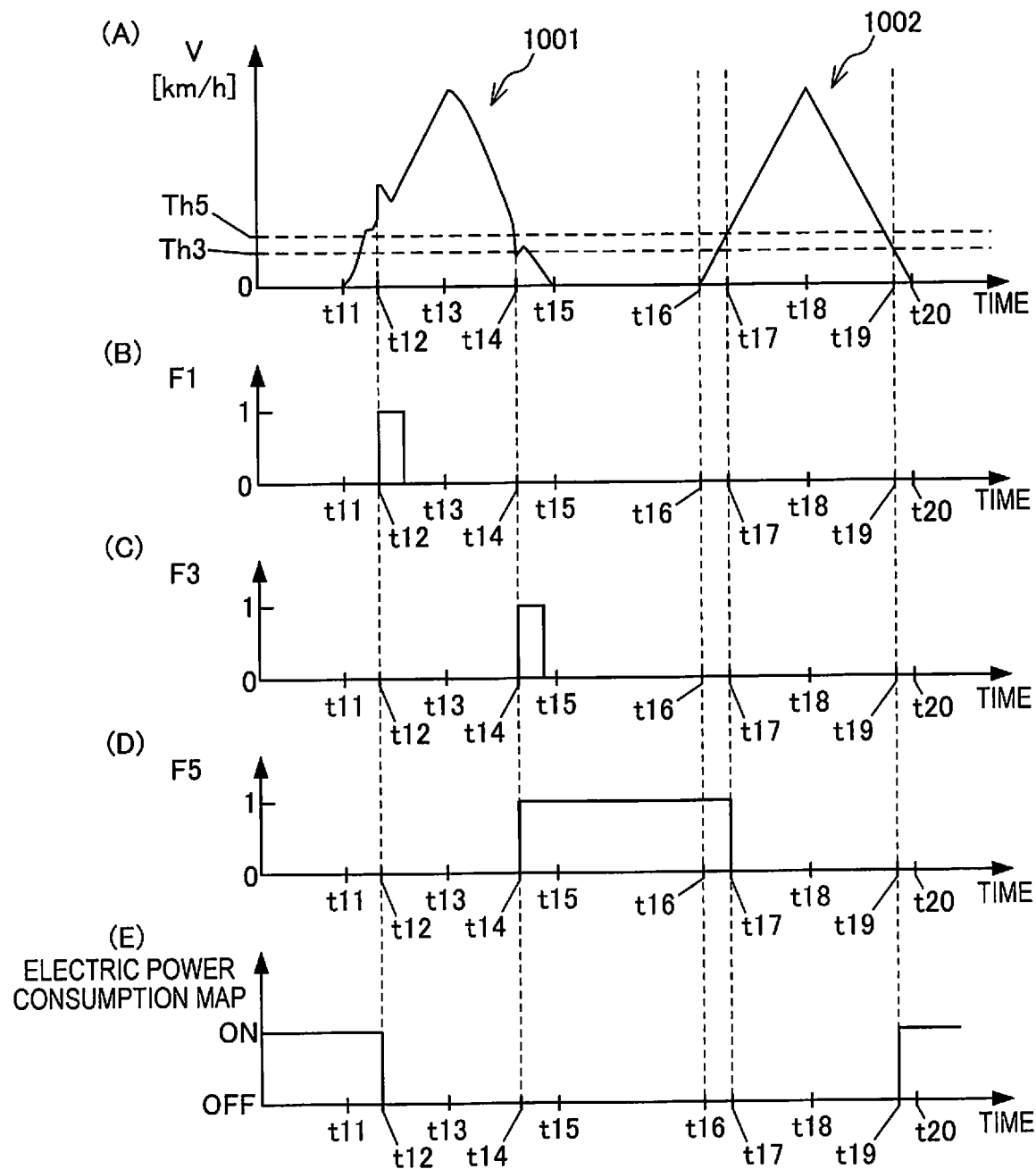
FIG. 10 is a timing chart showing other examples of (A) vehicle speed, (B) a slip flag, (C) a coasting slip sensing flag, (D) a slip experience flag, and (E) a transition of an electricity consumption map between on and off states.

FIG. 10 is a timing chart showing other examples of (A) the vehicle speed V, (B) the slip flag F1, (C) the coasting slip sensing flag F3, (D) the slip experience flag F5, and (E) the transition of the electricity consumption map between on and off states. As shown in FIG. 10(A), for example, in a third trip 1001, the vehicle 100 accelerates from time t11 to time t13, and then decelerates from time t13 to time t15. In the third trip 1001, drive slip occurs at time t12, which takes place during acceleration and between time t11 and time t13. Furthermore, in the third trip 1001, coasting slip occurs at time t14, which takes place during deceleration and between time t13 and time t15.

As shown in FIG. 10(B), when drive slip occurs at time t12, the slip flag F1 is set to "1 (True)." In accordance therewith, the electricity consumption map cancellation flag F8 is set to "1 (True)" in the distribution ratio map switching process S550. Therefore, as shown in FIG. 10(E), the electricity consumption map is turned off ("OFF") at time t12. As a result, subsequent to time t12 at which drive slip occurred, the vehicle 100 is driven using the distribution ratio κ based on the driving performance map. Further slipping of the vehicle 100 is thus suppressed subsequent to sensing of the drive slip.

When coasting slip then occurs at time t14 (refer to FIG. 10(A)) irrespective of the vehicle 100 being driven using the distribution ratio κ based on the driving performance map, the coasting slip is detected according to the coasting slip sensing process S531, as shown in FIG. 10(C). As a result, the slip experience flag F5 is set to "1 (True)," as shown in FIG. 10(D). Therefore, at the point in time when the vehicle speed V falls to or below the third threshold value Th3 and it is discerned that the vehicle 100 has stopped, the stop flag F2 is "1 (True)" and the slip experience flag F5 is "1 (True)." The flag F7, which is the negation of the logical disjunction of these two flags, is "0 (False)." In the distribution ratio map switching process S550, this flag F7 is used so as to maintain the electricity consumption map cancellation flag F8. Therefore, as shown in FIG. 10(E), the electricity consumption map is not returned to being on ("ON") even when it is discerned that the vehicle 100 has stopped, and the electricity consumption map is maintained in an off state ("OFF").

As shown in FIG. 10(A), in a fourth trip 1002, which follows the third trip 1001, the vehicle 100 accelerates from time t16 that is subsequent to time t15 to time t18, and then decelerates from time t18 to time t20. In the fourth trip 1002, the time when the vehicle speed V reaches or exceeds the fifth threshold value Th5 and it is discerned that the vehicle 100 has set off is time t17 between time t16 and time t18. In addition, in the fourth trip 1002, the time when the vehicle speed V falls to or below the third threshold value Th3 and it is discerned that the vehicle 100 has stopped is time t19 between time t18 and time t20.

In the fourth trip 1002, the slip experience flag F5, which was set to "1 (True)" at time t14 in the preceding third trip 1001, is maintained until time t17, which is when the vehicle 100 sets off (refer to FIG. 10(D)). Therefore, as shown in FIG. 10(E), the electricity consumption map is maintained in an off state ("OFF") during starting off in the fourth trip 1002. Thus, during starting off in the fourth trip 1002, the vehicle 100 is driven using the distribution ratio κ based on the driving performance map. As a result, even if the vehicle 100 has stopped on a road surface where slip readily occurs, as with the coasting slip occurring in the third trip 1001, the vehicle 100 can set off stably without slipping in the subsequent fourth trip 1002.

When it is discerned that the vehicle 100 has set off at time t17 in the fourth trip 1002, the slip experience flag F5 is cleared to "0 (False)," as shown in FIG. 10(D). Therefore, as long as no other slip of the vehicle wheels is detected in the fourth trip 1002, then at the point in time when it is discerned that the vehicle 100 has stopped at time t19 in the fourth trip 1002, the stop flag F2 is "1 (True)" and the slip experience flag F5 is "0 (False)." The flag F7, which is the negation of the logical disjunction of these two flags, is "1 (True)." In the distribution ratio map switching process S550, this flag F7 is used so as to clear the electricity consumption map cancellation flag F8. Therefore, at time t19, the electricity consumption map cancellation flag F8 is cleared to "0 (False)," and the electricity consumption map is returned to being on ("ON") (refer to FIG. 10(E)).

In the first embodiment described above, the setting-off discernment process S532 is incorporated into the slip experience flag process S530, whereby in cases where the slip experience flag F5 is set in a given trip, this flag is maintained until the vehicle 100 sets off in a subsequent trip. However, the slip experience flag F5 set in a given trip need not necessarily be cleared when the vehicle 100 sets off in a subsequent trip. For example, the slip experience flag F5 may be configured to be maintained until immediately after the vehicle 100 sets off in a subsequent trip. Specifically, the slip experience flag F5 set in a given trip is preferably maintained at least until the vehicle 100 sets off in a subsequent trip, and can be cleared at a discretionary timing subsequent to when the vehicle 100 sets off in the subsequent trip. However, even in the "subsequent trip," preparations should be made for switching the distribution ratio map in the same manner as in the trip in which the slip experience flag F5 was set. Therefore, the slip experience flag F5 is preferably cleared when the vehicle 100 is starting off, as in the first embodiment described above.

As described above, in the method for controlling the vehicle 100 according to the first embodiment, the distribution of drive force to the front wheels 9f and the rear wheels 9r, which are the vehicle wheels, can in principle be switched between the first distribution that is based on the electricity consumption map in which energy efficiency is prioritized and the second distribution that is based on the driving performance map in which driving performance is prioritized. The distribution of drive force is set to the second distribution in cases where wheel slip is detected during a trip in which the vehicle 100 reaches a stopped state from starting off, and returns to the first distribution once the vehicle has stopped. Moreover, in the method for controlling the vehicle 100 according to the first embodiment, the distribution of drive force is switched from the first distribution to the second distribution when slip of the vehicle wheels is detected at least during acceleration in a trip, and the slip experience flag F5 representing that the vehicle 100 has experienced slipping is set when slip of the vehicle wheels is detected during deceleration in the trip (refer to the third trip 1001 in FIG. 10). The slip experience flag F5 is maintained at least until the vehicle 100 sets off in a subsequent trip (e.g., the fourth trip 1002) (refer to, e.g., time t17 in FIG. 10). In cases where the slip experience flag F5 has been set while the vehicle 100 is stopping, the distribution of drive force is maintained in the second distribution (refer to time t15 in FIG. 10(E)). In cases where the slip experience flag F5 has not been set while the vehicle 100 is stopping, the distribution of drive force is returned to the first distribution (refer to time t19 in FIG. 10(E)).

This makes it possible to switch between a distribution ratio in which driving performance such as travel stability is emphasized and a distribution ratio in which energy efficiency is emphasized more appropriately than in the prior art, and to achieve a better balance between driving performance and energy efficiency. More specifically, because the position of the stopped vehicle 100 is invariable in principle, the position of the vehicle 100 upon decelerating and stopping is the same as or similar to the position of the vehicle 100 upon subsequently starting off, and there is also little change in the state of the road surface. Therefore, by switching the drive force distribution, according to the occurrence of slip of the vehicle wheels during deceleration, when the vehicle 100 is subsequently starting off after having stopped, as in the method for controlling the vehicle 100 according to the first embodiment described above, it is possible to suitably switch the drive force distribution during starting off when the drive force is high and the vehicle will tend to become unstable. Specifically, in the method for controlling the vehicle 100 according to the first embodiment, in cases where it is assessed to be highly likely that the vehicle wheels have stopped on a road surface where slip readily occurs, without the distribution of drive force being readily returned to the first distribution that is based on the electricity consumption map once the vehicle has stopped in a trip, the second distribution that is based on the driving performance map is maintained at least until the vehicle 100 sets off in a subsequent trip. As a result, during starting off when the drive force is high and the vehicle 100 will tend to become unstable, the vehicle 100 can be driven using a suitable drive force distribution.

The method for controlling the vehicle 100 according to the first embodiment described above can be restated as one in which: when slip of the vehicle wheels in a form such that the speed of the vehicle wheels exceeds the speed of the vehicle 100 (drive slip) is detected, the distribution of drive force is switched from the first distribution to the second distribution; and when slip of the vehicle wheels in a form such that the speed of the vehicle wheels falls below the speed of the vehicle 100 (coasting slip) is detected, the slip experience flag representing that the electrically driven four-wheel-drive vehicle has experienced slipping is set. From this standpoint as well, in the method for controlling the vehicle 100 according to the first embodiment, by switching the drive force distribution during subsequent starting off after the vehicle 100 has stopped, in accordance with the occurrence of slip of the vehicle wheels during deceleration, it is possible to suitably switch the drive force distribution during starting off when the drive force is high and the vehicle tends to become unstable, in the same manner as described above.

In the method for controlling the vehicle 100 according to the first embodiment described above, the slip flag F1 is set or cleared through the comprehensive discernment process S513 in consideration of the results of not only the drive slip sensing process S511 but also the lateral slip sensing process S512. Specifically, in the method for controlling the vehicle 100 according to the first embodiment described above, when slip of the vehicle wheels (lateral slip) such that the vehicle wheels slide in a lateral direction is detected, the distribution of drive force is switched from the first distribution to the second distribution. Thus, in the method for controlling the vehicle 100 according to the first embodiment, it is possible to drive the vehicle 100 using a suitable drive force distribution not only in cases where drive slip has occurred but also in cases where lateral slip has occurred.

In the method for controlling the vehicle 100 according to the first embodiment described above, slip of the vehicle wheels (drive slip and/or lateral slip) according to switching from the first distribution to the second distribution is detected by sensing that the absolute value of feedback torque (slip torque Ts and/or yaw feedback torque Ty) used in feedback control (feedback process S440 and/or yaw feedback control S411) for reducing slip of the vehicle wheels has reached or exceeded the first threshold value Th1. Therefore, in the method for controlling the vehicle 100 according to the first embodiment described above, it is possible to sense slip of the vehicle wheels according to switching from the first distribution to the second distribution with particularly excellent precision.

In the method for controlling the vehicle 100 according to the first embodiment described above, slip of the vehicle wheels according to setting of the slip experience flag F5 is detected by sensing coasting slip (time t14 in FIG. 10). This corresponds to a feature in which slip of the vehicle wheels according to setting of the slip experience flag F5 is detected by sensing that the difference between the speed $\omega w$ of the vehicle wheels and the speed of the vehicle 100 (vehicle speed V) has reached or exceeded a prescribed value. Specifically, the slip experience flag F5 is set on the basis of divergence between the speed $\omega w$ of the vehicle wheels and the vehicle speed V (vehicle body speed), whereby usage of the second distribution is maintained. Thus, if the slip experience flag F5 is set on the basis of divergence between the speed $\omega w$ of the vehicle wheels and the vehicle speed V, driving under the second distribution will be maintained not only in cases where the vehicle 100 has slipped by a large amount but also in cases where a small amount of slip that would not be readily noticeable by the driver has occurred. As a result, when starting off in a subsequent trip, the vehicle 100 can stably set off without slipping even in cases where the driver is unaware that the vehicle 100 had stopped on a road surface where slip readily occurs.

Second Embodiment

A vehicle 100 in the present second embodiment has, in addition to the control scheme of the first embodiment, a first drive mode and a second drive mode as drive modes. A motor controller 2 can switch back and forth between the first drive mode and the second drive mode on the basis of, inter alia, a setting or operation performed by a driver, etc. The motor controller 2 can distinguish between the drive modes. In the first drive mode, the vehicle 100 is caused to travel according to the control method in the first embodiment. Specifically, in the first drive mode, the vehicle 100 travels while the distribution of drive force to front wheels 9f and rear wheels 9r is switched between a first distribution that is based on an electricity consumption map in which energy efficiency is prioritized and a second distribution that is based on a driving performance map in which driving performance is prioritized. However, in the second drive mode, the vehicle 100 travels under the second distribution without switching between the first distribution and the second distribution. The first drive mode is "eco mode," and the second drive mode is "sport mode."

In the vehicle 100 in the present embodiment, a state of a feedback process S440 (feedback control) is changed between the first drive mode and the second drive mode. Therefore, in the first drive mode, a distribution ratio κ can be particularly suitably switched. As a result, electricity consumption or travel stability in the first drive mode is improved.

In the vehicle 100 in the present embodiment, the feedback process S440 can be turned on and off. Specifically, the motor controller 2 determines whether to perform the feedback process S440 according to whether slip of the vehicle wheels is greater than a prescribed feedback control intervention threshold value Th7 (not shown). In the present embodiment as well, slip of the vehicle wheels is discerned though a slip discernment process S510 on the basis of, inter alia, slip torque Ts calculated in the feedback process S440. In cases where slip of the vehicle wheels (e.g., the slip torque Ts) is greater than the feedback control intervention threshold value Th7, the feedback process S440 is turned on (activated), and in cases where slip of the vehicle wheels is equal to or less than the feedback control intervention threshold value Th7, the feedback process S440 is turned off (deactivated). Furthermore, the feedback control intervention threshold value Th7 can be changed on the basis of control of the motor controller 2.

Figure 11:
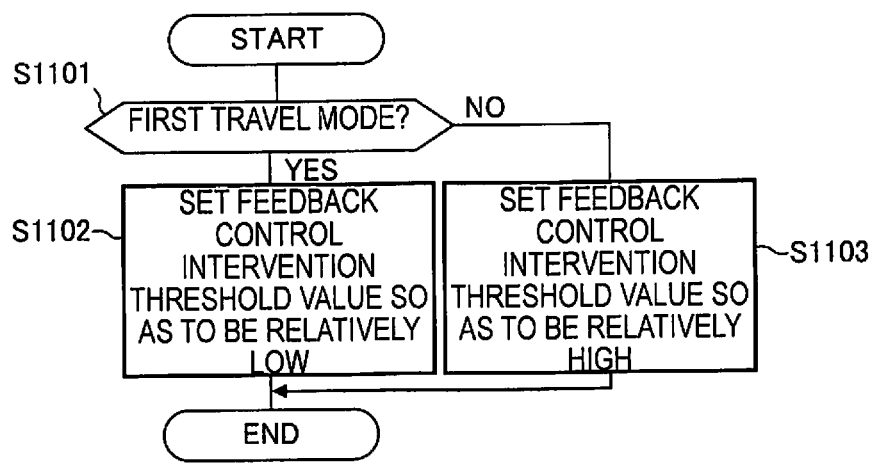
FIG. 11 is a flow chart showing a method for controlling an electrically driven four-wheel-drive vehicle according to a second embodiment.

FIG. 11 is a flow chart showing a method for controlling an electrically driven four-wheel-drive vehicle according to the second embodiment. As shown in FIG. 11, in the present embodiment, in cases where the drive mode is the first drive mode (YES in step S1101), the feedback control intervention threshold value Th7 is set so as to be relatively lower (step S1102) than that in cases where the drive mode is the second drive mode. However, in cases where the drive mode is the second drive mode (NO in step S1101), the feedback control intervention threshold value Th7 is set so as to be relatively higher (step S1103) than that in cases where the drive mode is the first drive mode.

Thus, when the feedback control intervention threshold value Th7 is set in the first drive mode so as to be lower than in the second drive mode, the feedback process S440 will be more readily activated in the first drive mode. In situations where the feedback process S440 is activated, the slip flag F1 also is readily set to "1 (True)." Therefore, in the control scheme described above, when slip is actually occurring or when it appears that slip will occur, the distribution of drive force is readily switched to the second distribution that is based on the driving performance map before behavior of the vehicle 100 is greatly disturbed. As a result, in the method for controlling the vehicle 100 according to the second embodiment described above, travel of the vehicle 100 is readily stabilized.

Figure 12:
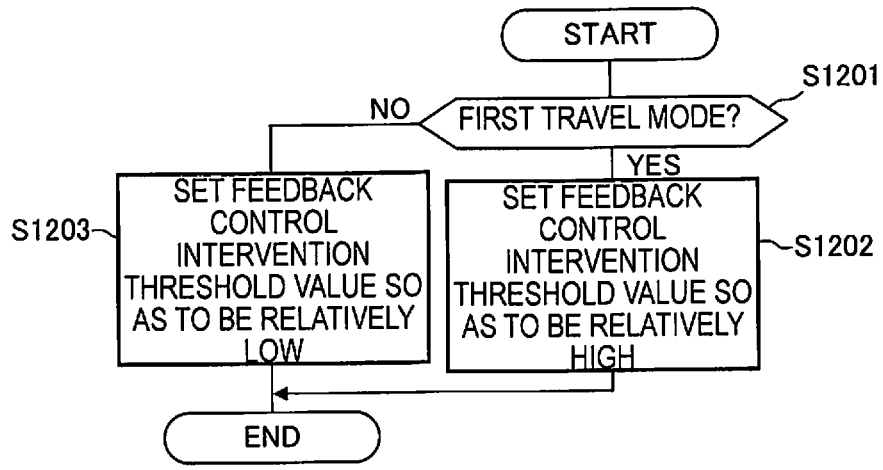
FIG. 12 is a flow chart showing a method for controlling an electrically driven four-wheel-drive vehicle according to a modification of the second embodiment.

In the second embodiment described above, the feedback control intervention threshold value Th7 is set low in the first drive mode and is set high in the second drive mode; however, the present invention is not limited to this arrangement. For example, FIG. 12 is a flow chart showing a method for controlling an electrically driven four-wheel-drive vehicle according to a modification of the second embodiment. As shown in FIG. 12, as the reverse of the second embodiment described above, in cases where the drive mode is the first drive mode (YES in step S1201), the feedback control intervention threshold value Th7 is set relatively high (S1202). In cases where the drive mode is the second drive mode (NO in step S1201), the feedback control intervention threshold value Th7 is set relatively low (step S1203).

When the feedback control intervention threshold value Th7 is set in the first drive mode so as to be greater than in the second drive mode, as in this modification, the feedback process S440 will be less readily activated in the first drive mode. In situations where the feedback process S440 is not activated, the slip flag F1 also is readily set to "0 (False)." Therefore, when the feedback control intervention threshold value Th7 in the first drive mode is set high, travel under the first distribution that is based on the electricity consumption map is maintained as much as possible within a range in which safety can be guaranteed. Thus, in the method for controlling the vehicle 100 according to the modification described above, the vehicle 100 can be driven with excellent electricity consumption.

Third Embodiment

A vehicle 100 in the present third embodiment has, in addition to the control scheme of the first embodiment, a first drive mode and a second drive mode as drive modes, similarly to the second embodiment. In the vehicle 100 in the present embodiment, a state of a feedback process S440 (feedback control) is changed between the first drive mode and the second drive mode, similarly to the second embodiment. However, in the present embodiment, the method for changing the state of the feedback process S440 differs from that in the second embodiment. Specifically, in the present embodiment, a gain $K_{FB}$ (not shown) of the feedback process S440 is variable. The motor controller 2 switches the gain $K_{FB}$ of the feedback process S440 (feedback control) in accordance with the drive mode.

Figure 13:
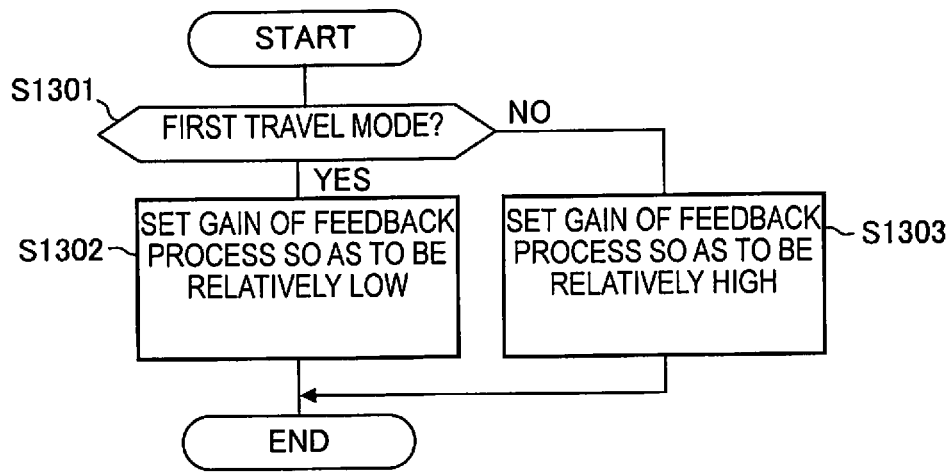
FIG. 13 is a flow chart showing a method for controlling an electrically driven four-wheel-drive vehicle according to a third embodiment.

FIG. 13 is a flow chart showing a method for controlling an electrically driven four-wheel-drive vehicle according to the third embodiment. As shown in FIG. 13, in the present embodiment, in cases where the drive mode is the first drive mode (YES in step S1301), the gain $K_{FB}$ of the feedback process S440 is set so as to be relatively lower (step S1302) than that in cases where the drive mode is the second drive mode. However, in cases where the drive mode is the second drive mode (NO in step S1301), the gain $K_{FB}$ of the feedback process S440 is set so as to be relatively higher (step S1303) than that in cases where the drive mode is the first drive mode.

Thus, when the gain $K_{FB}$ of the feedback process S440 (feedback control) is set in the first drive mode so as to be lower than in the second drive mode, the effect of the feedback process S440 is reduced in the first drive mode. In situations where the effect of the feedback process S440 is reduced, the slip flag F1 also is readily set to "0 (False)." Therefore, when the gain $K_{FB}$ of the feedback process S440 is set low in the first drive mode, travel under the first distribution that is based on the electricity consumption map is maintained as much as possible within a range in which safety can be guaranteed. Thus, in the method for controlling the vehicle 100 in the modification described above, the vehicle 100 can be driven with excellent electricity consumption.

Figure 14:
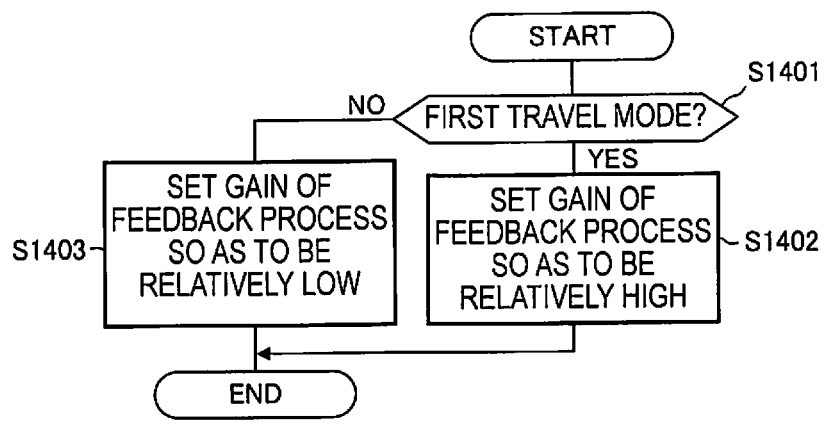
FIG. 14 is a flow chart showing a method for controlling an electrically driven four-wheel-drive vehicle according to a modification of the third embodiment.

In the third embodiment described above, the gain $K_{FB}$ of the feedback process S440 is set low in the first drive mode and is set high in the second drive mode; however, the present invention is not limited to this arrangement. For example, FIG. 14 is a flow chart showing a method for controlling an electrically driven four-wheel-drive vehicle according to a modification of the third embodiment. As shown in FIG. 14, as the reverse of the third embodiment described above, in cases where the drive mode is the first drive mode (YES in step S1401), the gain $K_{FB}$ of the feedback process S440 is set relatively high. In cases where the drive mode is the second drive mode (NO in step S1401), the gain $K_{FB}$ of the feedback process S440 is set relatively low.

When the gain $K_{FB}$ of the feedback process S440 is set in the first drive mode so as to be greater than in the second drive mode, as in this modification, the effect of the feedback process S440 increases in the first drive mode. In situations where the effect of the feedback process S440 increases, the slip flag F1 also is readily set to "1 (True)." Therefore, in the control scheme of the present modification, when slip is actually occurring or when it appears that slip will occur, the distribution of drive force is readily switched to the second distribution that is based on the driving performance map before behavior of the vehicle 100 is greatly disturbed. As a result, in the method for controlling the vehicle 100 according to the modification described above, travel of the vehicle 100 is readily stabilized.

Although embodiments of the present invention are described above, the configurations described in these embodiments and modifications merely illustrate some application examples of the present invention, and are not intended to limit the technical scope of the present invention. For example, some or all of the controls according to the first embodiment, the second embodiment, and the third embodiment can be executed in combination in a discretionary manner.

The invention claimed is:

1. A control method for controlling an electrically driven four-wheel-drive vehicle in which a distribution of a drive torque to front wheels and rear wheels that are vehicle wheels can be switched between a first distribution in which energy efficiency is prioritized and a second distribution in which driving performance is prioritized, the distribution being set to the second distribution in cases where wheel slip is detected during a trip in which a stopping state is reached after starting off, and the distribution being returned to the first distribution once the electrically driven four-wheel-drive vehicle has stopped, the control method comprising:
   switching the distribution from the first distribution to the second distribution when the wheel slip is detected at least during acceleration in the trip;
   setting a slip experience flag representing that the electrically driven four-wheel-drive vehicle has experienced slipping when the wheel slip is detected during deceleration in the trip;
   maintaining the slip experience flag at least until the electrically driven four-wheel-drive vehicle starts on a subsequent trip;
   maintaining the distribution as the second distribution where the slip experience flag has been set when the electrically driven four-wheel-drive vehicle has stopped; and
   returning the distribution to the first distribution where the slip experience flag has not been set once the electrically driven four-wheel-drive vehicle has stopped.

2. A control method for controlling an electrically driven four-wheel-drive vehicle in which a distribution of a drive torque to front wheels and rear wheels that are vehicle wheels can be switched between a first distribution in which energy efficiency is prioritized and a second distribution in which driving performance is prioritized, the distribution being set to the second distribution in cases where wheel slip is detected during a trip in which a stopping state is reached after starting off, and the distribution being returned to the first distribution once the electrically driven four-wheel-drive vehicle has stopped, the control method comprising:
   switching the distribution from the first distribution to the second distribution when the wheel slip is in a form such that a speed of the wheels exceeds a speed of the electrically driven four-wheel-drive vehicle that is detected;
   setting a slip experience flag representing that the electrically driven four-wheel-drive vehicle has experienced slipping when the wheel slip is in a form such that the speed of the wheels falls below the speed of the electrically driven four-wheel-drive vehicle that is detected;

maintaining the slip experience flag at least until the electrically driven four-wheel-drive vehicle starts on in a subsequent trip;

maintaining the distribution as the second distribution when the electrically driven four-wheel-drive vehicle has stopped where the slip experience flag has been set; and returning the distribution to the first distribution once the electrically driven four-wheel-drive vehicle has stopped where the slip experience flag has not been set.

3. The control method according to claim 1, wherein the distribution is switched from the first distribution to the second distribution upon detecting the wheels sliding in a lateral direction as the wheel slip.

4. The control method according to claim 1, wherein the wheel slip for switching from the first distribution to the second distribution is detected by detecting that an absolute value of feedback torque used in a feedback control for reducing the wheel slip is equal to or greater than a first threshold value is a first drive mode.

5. The control method according to claim 1, wherein the wheel slip for setting of the slip experience flag is detected by detecting that a difference between the speed of the vehicle wheels and the speed of the electrically driven four-wheel-drive vehicle during deceleration in the trip has reached or exceeded a prescribed value.

6. A control method according to claim 4, wherein the electrically driven four-wheel-drive vehicle has a second drive mode for traveling under the second distribution; and a state of the feedback control is changed between the first drive mode and the second drive mode.

7. The control method according to claim 6, wherein a determination as to whether to perform the feedback control is made based on whether the wheel slip is greater than a feedback control intervention threshold value, and the feedback control intervention threshold value is set lower in the first drive mode than in the second drive mode.

8. The control method according to claim 6, wherein a gain of the feedback control is set lower in the first drive mode than in the second drive mode.

9. The control method according to claim 6, wherein a determination as to whether to perform the feedback control is made based on whether the wheel slip is greater than a feedback control intervention threshold value, and the feedback control intervention threshold value is set higher in the first drive mode than in the second drive mode.

10. The control method according to claim 6, wherein a gain of the feedback control is set higher in the first drive mode than in the second drive mode.

11. A control device for controlling an electrically driven four-wheel-drive vehicle in which a distribution of a drive torque to front wheels and rear wheels that are vehicle wheels can be switched between a first distribution in which energy efficiency is prioritized and a second distribution in which driving performance is prioritized, the distribution being set to the second distribution in cases where wheel slip is detected during a trip in which a stopping state is reached after starting off, and the distribution being returned to the first distribution once the electrically driven four-wheel-drive vehicle has stopped, wherein the control device comprising:

a controller configured to switch the distribution from the first distribution to the second distribution when the wheel slip is detected at least during acceleration in the trip;

set a slip experience flag representing that the electrically driven four-wheel-drive vehicle has experienced slipping when the wheel slip is detected during deceleration in the trip;

maintain the slip experience flag at least until the electrically driven four-wheel-drive vehicle starts on a subsequent trip;

maintain the distribution as the second distribution where the slip experience flag has been set when the electrically driven four-wheel-drive vehicle has stopped; and return the distribution to the first distribution where the slip experience flag has not been set once the electrically driven four-wheel-drive vehicle has stopped.

* * * * *